(12) United States Patent
Chiu et al.

(10) Patent No.: US 12,287,276 B2
(45) Date of Patent: Apr. 29, 2025

(54) DETECTING DEVICE FOR DETECTING BIOLOGICAL PARTICLES AND DETECTING METHOD THEREOF

(71) Applicant: Chi-Kun Ohyang, Taoyuan (TW)

(72) Inventors: Tzu-Keng Chiu, New Taipei (TW); Yu-Xian Zhu, Hsinchu County (TW); Chi-Kun Ohyang, Taoyuan (TW); Cheng-Fang Yang, New Taipei (TW)

(73) Assignee: LIQBIO BIOMEDICAL COMPANY LIMITED, New Taipei (TW)

( * ) Notice: Subject to any disclaimer, the term of this patent is extended or adjusted under 35 U.S.C. 154(b) by 141 days.

(21) Appl. No.: 17/688,031

(22) Filed: Mar. 7, 2022

(65) Prior Publication Data

US 2022/0307984 A1  Sep. 29, 2022

(30) Foreign Application Priority Data

Mar. 24, 2021 (TW) .................. 110110518

(51) Int. Cl.
*G01N 15/1434* (2024.01)
*G01N 15/14* (2024.01)
*G01N 21/64* (2006.01)

(52) U.S. Cl.
CPC ..... *G01N 15/1434* (2013.01); *G01N 15/1425* (2013.01); *G01N 2021/6439* (2013.01); *G01N 21/6456* (2013.01)

(58) Field of Classification Search
CPC ........... G01N 21/6486; G01N 21/6402; G01N 21/6428; G01N 21/645; G01N 21/6456;
(Continued)

(56) References Cited

U.S. PATENT DOCUMENTS 4,758,727 A   7/1988 Tomei et al.
8,209,128 B1  6/2012 Gourley
(Continued)

FOREIGN PATENT DOCUMENTS

JP   10-293094 A   11/1998
JP   11-271209 A   10/1999

OTHER PUBLICATIONS

Extended European Search Report for European Application No. 21185592.9, dated Jan. 5, 2022.
(Continued)

*Primary Examiner* — Mary Ellen Bowman
*Assistant Examiner* — Justin J Van Cleave
(74) *Attorney, Agent, or Firm* — Birch, Stewart, Kolasch & Birch, LLP

(57) ABSTRACT

A detecting device for detecting biological particles includes an optical system including an excitation light source, a filter and spectroscope group, a photomultiplier tube, and a charge-coupled device. The excitation light source illuminates the biological particles on a detecting carrier of the detecting device. A kind of target biological particles in the biological particles is excited to generate an emission light. The emission light enters the filter and spectroscope group to be separated into a first detecting light and a second detecting light. After the photomultiplier tube receives the first detecting light, the photomultiplier tube transmits a regional positioning signal to a processor of the detecting device. After the charge-coupled device receives the second detecting light, the charge-coupled device transmits an image signal to the processor. The processor obtains a precise location of the target biological particles based on the regional positioning signal and the image signal. A detecting method of the detecting device is also provided.

13 Claims, 14 Drawing Sheets

(58) Field of Classification Search
CPC ..... G01N 2021/6439; G01N 2015/144; G01N 15/1443; G01N 15/1425; G01B 21/008
See application file for complete search history.

(56) References Cited

U.S. PATENT DOCUMENTS

| | | | |
|---|---|---|---|
| 2002/0177885 A1* | 11/2002 | Eisfeld | G06V 20/69 607/101 |
| 2006/0094109 A1* | 5/2006 | Trainer | G01N 35/0098 435/808 |
| 2012/0229815 A1* | 9/2012 | Langholz | G01N 21/6458 356/601 |
| 2015/0185456 A1* | 7/2015 | Kishima | G02B 21/008 348/80 |
| 2015/0268244 A1 | 9/2015 | Cho et al. | |
| 2017/0307440 A1* | 10/2017 | Urban | G01N 21/6458 |
| 2018/0364270 A1* | 12/2018 | Chiu | C12Q 1/686 |
| 2020/0080833 A1* | 3/2020 | Yamauchi | G01B 9/02087 |
| 2020/0297208 A1* | 9/2020 | Lapointe | G01J 3/447 |

OTHER PUBLICATIONS

Goldstein et al., "A system for automatically scanning tissue culture dishes to detect fluorescently labeled cell colonies," Review of Scientific Instruments, vol. 60, No. 7, 1989, pp. 1267-1274, 8 pages total.

Li et al., "Efficient nano-tweezers via a silver plasmonic bowtie notch with curved grooves," Photonics Research, vol. 9, No. 3, 2021, pp. 281-288, 8 pages total.

Taiwanese Search Report for Taiwanese Application No. 110110518, dated Mar. 8, 2022, with an English translation.

Taiwanese Search Report for Taiwanese Application No. 110110518, dated Aug. 31, 2022, with English translation.

* cited by examiner

DETECTING DEVICE FOR DETECTING BIOLOGICAL PARTICLES AND DETECTING METHOD THEREOF

BACKGROUND OF THE INVENTION

Technical Field

The present invention is related to a measuring and check system and more particularly to a detecting device for detecting biological particles and a detecting method of the detecting device.

Description of Related Art

Nowadays, optical sensors are widely used in measurement systems in various fields and can perform large-scale detection and imaging characteristics, so that the optical sensors are widely used in the field of biomedical imaging. In the field of biomedicine, fluorescent imaging with optical sensors is often used to facilitate image monitoring or scanning detection.

The fluorescent imaging technology of the conventional scanning detection device must have a lens group, a scanning sensor, and a light source. The light source emits a high-penetration light (e.g. near-infrared light, laser light) and illuminates a plurality of biological particles on a device carrier, so that at least part of the biological particles emit an emission light after being illuminated. The emission light emitted by the biological particles can pass through the lens group to filter the light waves and then enter the optical sensor, so that the optical sensor can capture an image of the biological particles and locate a position of each biological particle for analyzing and observing the activity of a target biological particle, and even further select it.

In order to obtain a better image resolution, the conventional scanning and detecting device usually adds a combination of a mirror group, a scanning sensor, and a light source near the device carrier. However, a scanning sensor of the combination scanning and detecting device and another scanning sensor easily cause interference in mechanical motion due to the poor integration of the respective moving devices. Moreover, the structure of the combination scanning and detecting device is too complicated, resulting in a large volume and a large weight. Therefore, it is necessary to solve the abovementioned problems.

BRIEF SUMMARY OF THE INVENTION

In view of the above, the purpose of the present invention is to provide a detecting device for detecting biological particles and a detecting method thereof which has characteristics of reducing a volume and a weight of the overall device and a precise movement path during detection, and at the same time efficiently positioning and identifying biological particles.

The present invention provides a detecting device for detecting a plurality of biological particles, wherein the detecting device includes detecting carrier for placing the biological particles and an optical system. The biological particles include at least one kind of target biological particles. The optical system includes an excitation light source, a filter and spectroscope group, at least one photomultiplier tube, and at least one charge-coupled device. The excitation light source is adapted to provide an excitation light to illuminate the biological particles, and the at least one kind of target biological particles in the biological particles is illuminated and excited by the excitation light to generate an emission light. The filter and spectroscope group includes a beam splitter located on a light path of the emission light and is adapted to separate the incident emission light into a first detecting light and a second detecting light that account for different proportions of the emission light and respectively emit the first detecting light and the second detecting light, wherein a ratio of the first detecting light to the emission light ranges between 0.1 and 0.5, and a ratio of the second detecting light to the emission light ranges between 0.5 and 0.9. The at least one photomultiplier tube is adapted to receive the first detecting light and moves relative to the detecting carrier. When the at least one photomultiplier tube receives the first detecting light, the at least one photomultiplier tube generates a regional positioning signal including a regional position of the at least one kind of target biological particles on the detecting carrier. The at least one charge-coupled device is adapted to receive the second detecting light and moves relative to the detecting carrier. When the at least one charge-coupled device receives the second detecting light, the at least one charge-coupled device generates an image signal comprising an image position of the at least one kind of target biological particles on the detecting carrier.

The present invention further provides a detecting method applied to the aforementioned detecting device, wherein the detecting device includes a processor electrically connected to the optical system. The detecting method includes following steps:

Step A: emit the excitation light by the excitation light source to illuminate the biological particles;

Step B: absorb the excitation light by the at least one kind of target biological particles in the biological particles to generate the emission light, and emit the emission light into the filter and spectroscope group;

Step C: separate the emission light into the first detecting light and the second detecting light by the filter and spectroscope group to emit, and the first detecting light and the second detecting light respectively enter the at least one photomultiplier tube and the at least one charge-coupled device;

Step D: receive the first detecting light and generate the regional positioning signal by the at least one photomultiplier tube;

Step E: determine that at least one of the regional positions on the detecting carrier has the at least one kind of target biological particles by the processor based on the regional positioning signal;

Step F: receive the second detecting light and generate an image signal by the at least one charge-coupled device;

Step G: obtain a precise location of the at least one kind of target biological particles in at least one of the regional positions on the detecting carrier by the processor based on the image signal.

With the aforementioned design, the detecting device for detecting the biological particles only needs an excitation light source and a filter and spectroscope group to achieve the purpose of locating the precise location of the target biological particles by the photomultiplier tube and the charge-coupled device at the same time. Additionally, the photomultiplier tube first quickly scans and determines the regional positions of the target biological particles, wherein when discovers the target biological particles, the charge-coupled device then finely locates the precise position of the target biological particles, thereby achieving the effect of high-efficiency detection and high detection accuracy. By integrating the photomultiplier tube with the charge-coupled device, the movement during scanning and detecting could be more precise, which provides more space to use at the same time.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
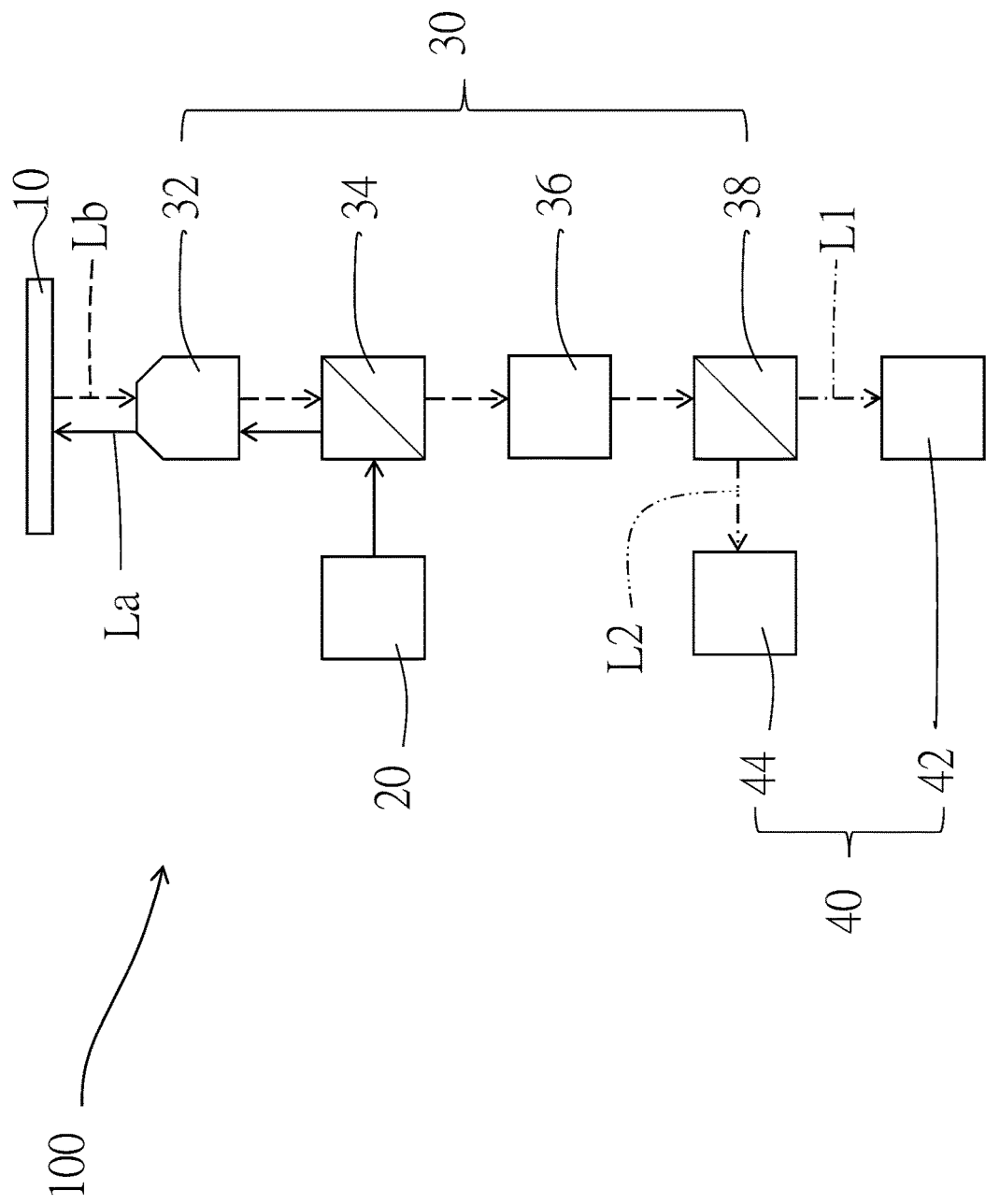
FIG. 1 is a schematic view of the detecting device for detecting biological particles according to a first embodiment of the present invention.
Figure 2:
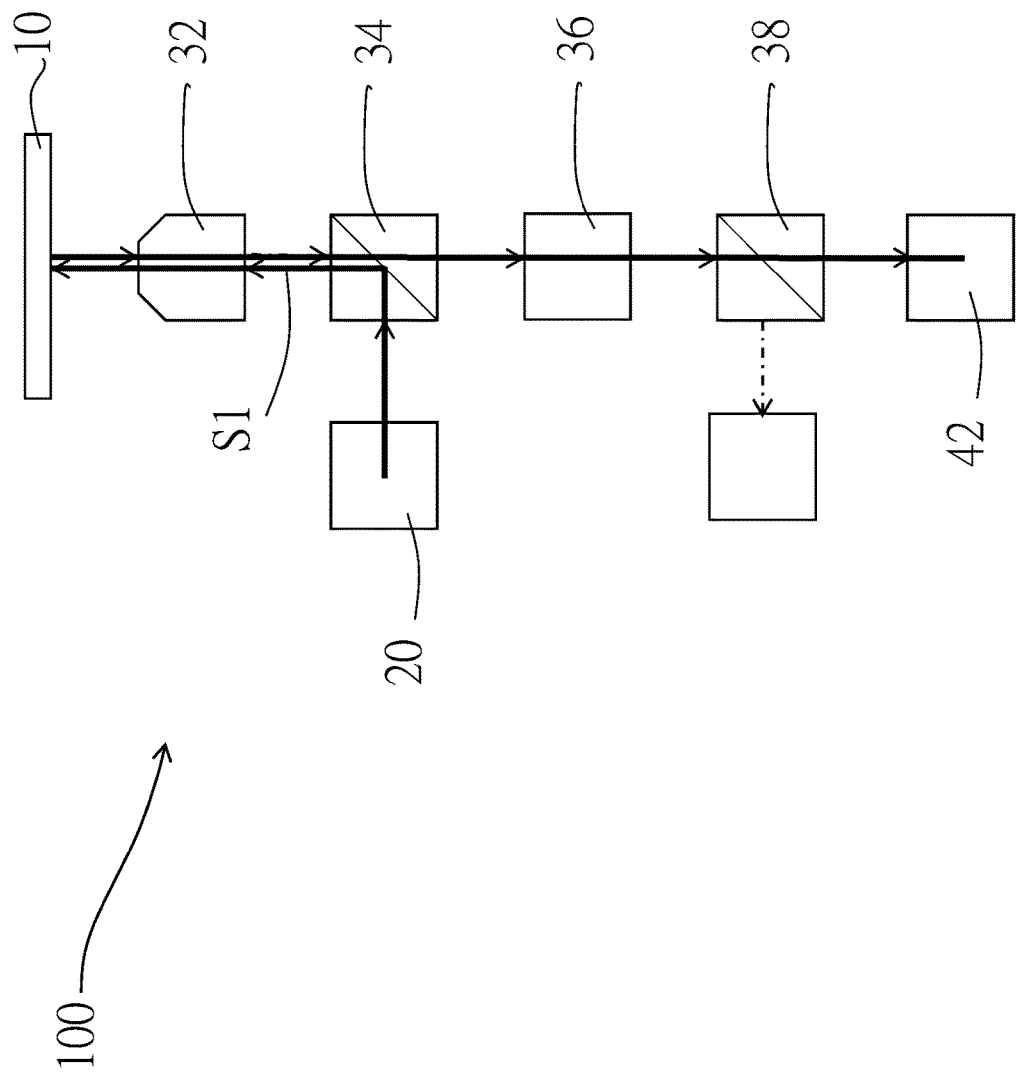
FIG. 2 is another schematic view of the detecting device according to the first embodiment, showing the first light path.
Figure 3:
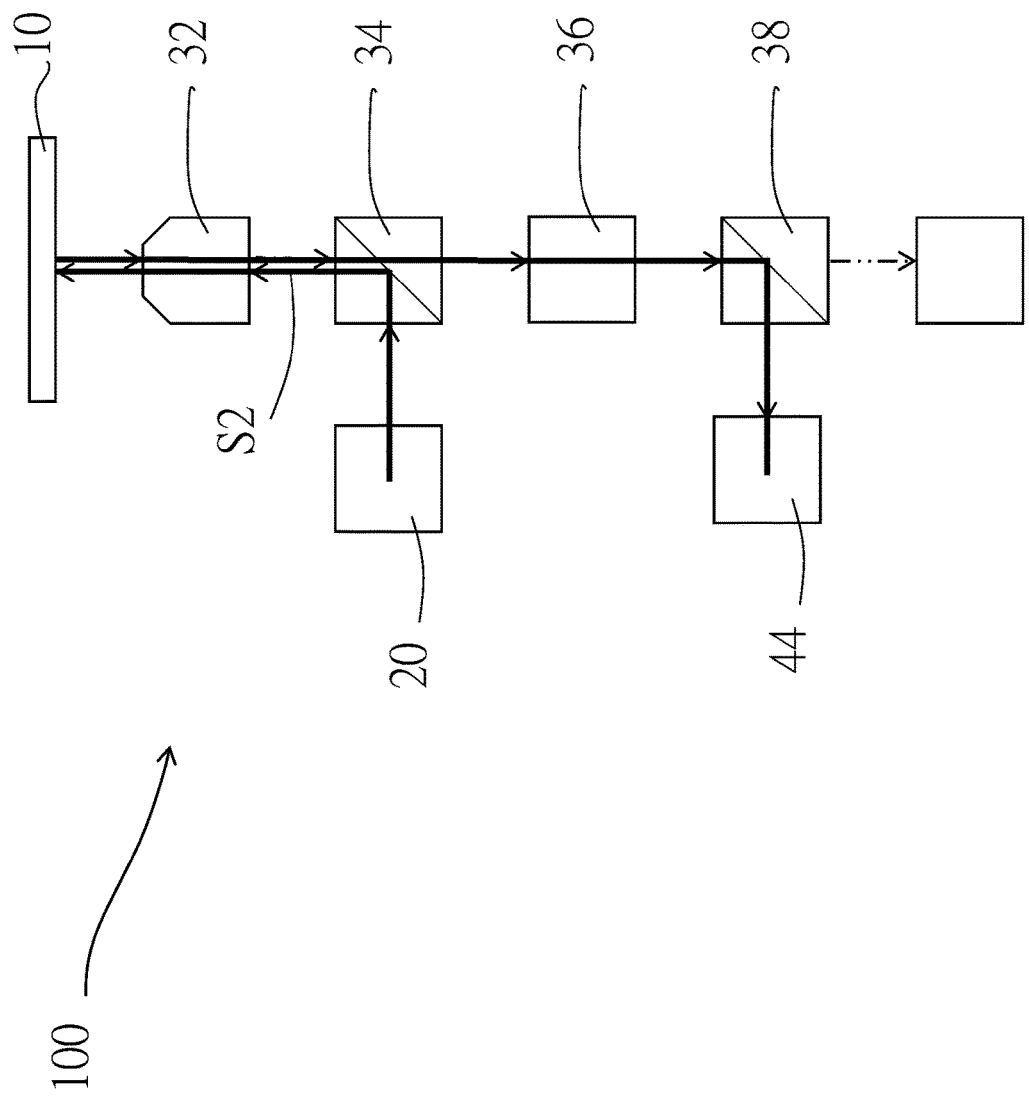
FIG. 3 is still another schematic view of the detecting device according to the first embodiment, showing the second light path.

A detecting device 100 according to a first embodiment of the present invention is illustrated in FIG. 1 to FIG. 3 and includes a detecting carrier 10, an optical system (not shown), and a processor (not shown) electrically connected to the optical system, wherein the optical system includes an excitation light source 20, a filter and spectroscope group 30, and a scanning sensor group 40.

The detecting carrier 10 is adapted to be placed a plurality of biological particles (not shown), wherein the biological particles include, but not limited to, cells, bacteria, fungi, viruses, exosomes, liposomes, a carrier coated with a nucleic acid, or biological particles that could be understood by those with ordinary skill in the art. In addition, the biological particles include at least one kind of target biological particles, wherein the target biological particles include, but not limited to, substances such as nucleic acid, protein, lipid, glycoprotein, etc. Any substance of the at least one kind of target biological particles could be combined with at least one label, and the at least one label could be combined with a surface protein or a nucleic acid in a nucleus of the at least one target biological particles to serve as a research object, wherein the at least one label could be, but not limited to, fluorescent particles, luminescent particles, or quantum dots. In the current embodiment, one kind of the target biological particles is taken as an example, and the one kind of the target biological particles is combined with the label which is the fluorescent particles as an example.

The excitation light source 20 includes, but not limited to, laser light, mercury lamp, and LED lamp, wherein the excitation light source 20 is adapted to provide an excitation light La to illuminate the biological particles, and the target biological particles in the biological particles are illuminated by the excitation light La and excited to generate an emission light Lb. In addition, an optical wavelength of the excitation light La of the excitation light source 20 includes, but not limited to, infrared light, ultraviolet light, and visible light; an optical wavelength of the emission light Lb includes, but not limited to, infrared light, ultraviolet light, and visible light.

The filter and spectroscope group 30 includes an objective 32, a dichroic mirror 34, a filter set 36, and a beam splitter 38, wherein the objective 32, the dichroic mirror 34, the filter set 36, and the beam splitter 38 are sequentially disposed below the detecting carrier 10 from top down.

The objective 32 of the filter and spectroscope group 30 is located in a light path of the emission light Lb, and is adapted to focus the at least one target biological particles and enlarge and image the target biological particles. The dichroic mirror 34 is located in a light path of the excitation light La, and is adapted to reflect the excitation light La, so that the excitation light La being reflected illuminates the biological particles. In the current embodiment, the dichroic mirror 34 is further located in the light path of the emission light Lb, and the emission light Lb could penetrate through the dichroic mirror 34. The filter set 36 is located in the light path of the emission light Lb and includes a plurality of light filters (not shown), wherein the light filters are adapted to be passed by light with different wavelengths, so that a user could replace the light filters depending on the required demand. The light filters correspond to different kinds of the target biological particles, thereby generating the emission light Lb with different wavelengths and allowing at least one predetermined waveband to pass therethrough and eliminating other wavebands.

The beam splitter 38 is located in the light path of the emission light Lb and is adapted to separate the incident emission light Lb into a first detecting light L1 and a second detecting light L2 that account for different proportions of the emission light Lb, and respectively emit the first detecting light L1 and the second detecting light L2. Under a condition that ignores energy absorbed by the beam splitter 38 during the transmission of the emission light Lb, an energy of the emission light Lb is equal to a sum of an energy of the first detecting light L1 and an energy of the second detecting light L2. The beam splitter 38 usually defines a penetration rate and a reflectivity, wherein a sum of the penetration rate and the reflectivity is 100%. In the current embodiment, the penetration rate of the beam splitter 38 is 10%, and the reflectivity of the beam splitter 38 is 90%, that is, 10% of an energy of the emission light Lb received by the beam splitter 38 penetrates through the beam splitter 38, and the other 90% of the energy of the emission light Lb received by the beam splitter 38 is reflected by the beam splitter 38, wherein the 10% of the emission light Lb penetrating through the beam splitter 38 is the first detecting light L1, and the 90% of the emission light Lb reflected by a mirror of the beam splitter 38 is the second detecting light L2. A ratio of the first detecting light L1 to the emission light Lb ranges between 0.1 and 0.5, and a ratio of the second detecting light L2 to the emission light Lb ranges between 0.5 and 0.9. Preferably, the ratio of the first detecting light L1 to the emission light Lb ranges between 0.1 and 0.3, and the ratio of the second detecting light L2 to the emission light Lb ranges between 0.7 and 0.9. In the current embodiment, the ratio of the first detecting light L1 to the emission light Lb is 0.1, and the ratio of the second detecting light L2 to the emission light Lb is 0.9.

Referring to FIG. 1 to FIG. 3, the scanning sensor group 40 is connected to the beam splitter 38 and includes a photomultiplier tube (PMT) 42 and a charge-coupled device (CCD) 44, wherein both of the charge-coupled device 44 and the filter set 36 are located on the same side of the mirror of the beam splitter 38, and the charge-coupled device 44 is adapted to receive the second detecting light L2 (i.e., a reflected light), and the photomultiplier tube 42 is located on another side of the mirror of the beam splitter 38 and is adapted to receive the first detecting light L1 (i.e., a penetrating light). However, the penetration rate and the reflectivity of the beam splitter 38 could be changed to meet specific requirements. For instance, referring to FIG. 4, the photomultiplier tube 42 and the filter set 36 could be located on the same side of the mirror of the beam splitter 38, and the photomultiplier tube 42 could be adapted to receive the first detecting light L1 which is a reflected light, and the charge-coupled device 44 could be located on another side of the mirror of the beam splitter 38 for receiving the second detecting light L2 which is a penetrating light. The photomultiplier tube 42 has a photo detector with high sensitivity and ultra-fast response time, which could scan a large area quickly. When the photomultiplier tube 42 scans the detecting carrier 10 and receives the first detecting light L1, the photomultiplier tube 42 generates a regional positioning signal, wherein the regional positioning signal includes a regional position and an intensity of a fluorescent signal of the target biological particles on the detecting carrier 10. The charge-coupled device 44 could finely detect a digital image of the regional position. When the charge-coupled device 44 scans the regional position on the detecting carrier 10 and receives the second detecting light L2, the charge-coupled device 44 generates an image signal, wherein the image signal includes an image position of the target biological particles on the detecting carrier 10.

More specifically, referring to FIG. 1 to FIG. 3, a detecting method X could be applied by the aforementioned detecting device 100 to scan and detect the biological particles on the detecting carrier 10, wherein the detecting method X includes following steps A-G:

Step A: the excitation light source 20 emits the excitation light La, and the excitation light La is reflected by the dichroic mirror 34 and illuminates the biological particles;

Step B: the at least one kind of target biological particles in the biological particles absorbs the excitation light La to generate the emission light Lb, and the emission light Lb goes into the filter and spectroscope group 30;

a step between step B and step C: the emission light Lb passes through the objective 32 of the filter and spectroscope group 30 and goes into the filter set 36; then, the filter set 36 selects one of the light filters that could only be penetrated by a waveband of the emission light Lb, and filters out the excitation light La or lights with other wavebands, so that the emission light Lb enters the beam splitter 38 again;

Step C: the beam splitter 38 of the filter and spectroscope group 30 separates the emission light Lb into the first detecting light L1 and the second detecting light L2 to emit, and the first detecting light L1 and the second detecting light L2 respectively enter the photomultiplier tube 42 and the charge-coupled device 44;

Step D: the photomultiplier tube 42 and the detecting carrier 10 move relatively to scan the regional positions on the detecting carrier 10; when the photomultiplier tube 42 receives the first detecting light L1 in one of the regional positions of the detecting carrier 10, the photomultiplier tube 42 generates a regional positioning signal and transmits the regional positioning signal to the processor, wherein the regional positioning signal includes the intensity of the fluorescent signal of the at least one kind of target biological particles on the detecting carrier 10;

Step E: the processor determines that the regional positions on the detecting carrier 10 have the at least one kind of target biological particles based on the regional positioning signal, and transmits the regional positioning signal to the charge-coupled device 44;

Step F: the charge-coupled device 44 receives the second detecting light L2 to detect the image position of the at least one kind of target biological particles in the regional positions, thereby generating an image signal;

Step G: the processor obtains a precise location of the at least one kind of target biological particles in the regional positions on the detecting carrier 10 based on the image signal, and then returns to step D to scan other regional positions on the detecting carrier 10 which are not detected.

During a process that the detecting device 100 applies the detecting method X to detect the target biological particles, steps D-G are repeatedly executed until finishing the detection of all of the regional positions. The advantages of the detecting method X are that in a case that a number of cells on a sorting tray on the detecting carrier 10 is small, when the photomultiplier tube 42 detects the target biological particles in one of the regional positions, the charge-coupled device 44 could immediately generate the image signal of the corresponding regional position, which allows a metal needle (not shown) to immediately reach the corresponding regional position to absorb the target biological particles, thereby preventing the target biological particles from staying in the sorting tray for too long and reducing the problem of cells sticking to the sorting tray which would be hard to be absorbed.

For instance, the detecting carrier 10 could be divided into five regional positions with equal area, which are represented as A, B, C, D, E (not shown). However, the detecting carrier 10 could be divided into different numbers of the regional positions with different areas to meet various requirements, wherein the biological particles are randomly distributed on the regional positions, so that some regional positions have the at least one kind of target biological particles, and some regional positions do not have the target biological particles; the user could also select different labels, different fluorescents, and different light filters to identify the target biological particles. In step D, the photomultiplier tube 42 and the detecting carrier 10 move relatively to respectively scan the regional positions A, B, C, D, and E to detect the at least one kind of target biological particles.

During a process of executing the detecting method X, when the first detecting light L1 generated by exciting the label on the target biological particles by the excitation light La is detected by the photomultiplier tube 42 in one of the regional positions A on the detecting carrier 10, the photomultiplier tube 42 generates a regional positioning signal to record the intensity of the fluorescent signal of the corresponding regional position A, and the information of the regional positioning signal is transmitted to the processor. After that, the processor determines that the regional position A on the detecting carrier 10 has the at least one kind of target biological particles based on the regional positioning signal, and the regional positioning signal including a location information of the regional position A is transmitted to the charge-coupled device 44, thereby the charge-coupled device 44 receives the second detecting light L2 to detect the image position of the at least one kind of target biological particles in the regional position A to generate an image signal. The processor obtains the precise location of the at least one kind of target biological particles in the regional position A on the detecting carrier 10 based on the image signal. In this way, when the photomultiplier tube 42 receives the fluorescent signal of the target biological particles, the charge-coupled device 44 could instantly identify the precise location of the target biological particles, and the target biological particles could be instantly separated from the regional position, thereby preventing the target biological particles from staying on the detecting carrier 10 for too long and reducing the problem of cells sticking to the sorting tray which would be hard to be separated.

During a process of executing the detecting method X, when the emission light Lb generated by exciting the label on the target biological particles by the excitation light La is detected by the photomultiplier tube 42 in the regional position A on the detecting carrier 10, the photomultiplier tube 42 generates a regional positioning signal including the intensity of the fluorescent signal of the regional position A and transmits the regional positioning signal to the processor. After that, the processor determines that the regional position A on the detecting carrier 10 has the at least one kind of target biological particles based on the regional positioning signal, and the charge-coupled device 44 receives the second detecting light L2 to detect the image position of the at least one kind of target biological particles in the regional position A to generate the image signal. The processor obtains the precise location of the at least one kind of target biological particles in the regional position A on the detecting carrier 10 based on the image signal. Then, when the emission light Lb generated by exciting the label on the target biological particles by the excitation light La is detected by the photomultiplier tube 42 in another one of the regional positions (i.e. another regional position B) on the detecting carrier 10, the photomultiplier tube 42 generates another regional positioning signal including a fluorescent signal intensity of the another regional position B and transmits the another regional positioning signal to the processor. Next, the processor determines that the another regional position B on the detecting carrier 10 has the at least one kind of target biological particles based on the another regional positioning signal, and the charge-coupled device 44 receives the second detecting light L2 to detect an image position of the at least one kind of the target biological particles in the another regional position B to generate another image signal. The processor obtains a precise location of the at least one kind of the target biological particles in the another regional position B on the detecting carrier 10 based on the another image signal.

Referring to FIG. 1 to FIG. 3, another detecting method Y could be applied by the aforementioned detecting device 100 to scan and detect the biological particles on the detecting carrier 10, wherein the another detecting method Y includes following steps A-G:

Step A: the excitation light source 20 emits the excitation light La, and the excitation light La is reflected by the dichroic mirror 34 and illuminates the biological particles;

Step B: the at least one kind of target biological particles in the biological particles absorbs the excitation light La to generate the emission light Lb, and the emission light Lb enters the filter and spectroscope group 30;

a step between step B and step C: the emission light Lb passes through the objective 32 of the filter and spectroscope group 30 and goes into the filter set 36; then, the filter set 36 selects one of the light filters that could only be penetrated by a waveband of the emission light Lb, and filters out the excitation light La or lights with other wavebands, so that the emission light Lb enters the beam splitter 38 again;

Step C: the beam splitter 38 of the filter and spectroscope group 30 separates the emission light Lb into the first detecting light L1 and the second detecting light L2 to emit, and the first detecting light L1 and the second detecting light L2 respectively enter the photomultiplier tube 42 and the charge-coupled device 44;

Step D: the photomultiplier tube 42 and the detecting carrier 10 move relatively to scan the regional positions on the detecting carrier 10; when the photomultiplier tube 42 receives the first detecting light L1 in one of the regional positions of the detecting carrier 10, the photomultiplier tube 42 generates a regional positioning signal and transmits the regional positioning signal to the processor until all of the regional positions are scanned, wherein the regional positioning signal includes a regional position and an intensity of the fluorescent signal of the at least one kind of target biological particles on the detecting carrier 10;

Step E: the processor determines that at least one of the regional positions on the detecting carrier 10 has the at least one kind of target biological particles based on at least one of the regional positioning signals, and transmits at least one of the regional positioning signals to the charge-coupled device 44;

Step F: the charge-coupled device 44 moves relative to the detecting carrier 10 based on at least one of the regional positioning signals, and receives the second detecting light L2 in each of the regional positions to detect the image position of the at least one kind of target biological particles on the detecting carrier 10, thereby respectively generating an image signal;

Step G: the processor obtains a precise location of the at least one kind of target biological particles in at least one of the regional positions on the detecting carrier 10 based on at least one of the image signals.

During a process that the detecting device 100 applies the another detecting method Y to detect the target biological particles, the photomultiplier tube 42 scans all the regional positions at one time, and does not need to stop every time the scanning of one of the regional positions is completed and restart to scan another one of the regional positions when other components are done, so that a scanning speed of the another detecting method Y is faster than that of the detecting method X. In a case that a number of cells on a sorting tray on the detecting carrier 10 is small, a total processing time of the detecting device 100 by taking the detecting method X and a total processing time of the detecting device 100 by taking the another detecting method Y is close. However, in a case that a number of cells on a sorting tray on the detecting carrier 10 is large, a detection efficiency could be improved by using another detecting method Y for detection.

For instance, the detecting carrier 10 could be divided into five regional positions with equal area, which are represented as A, B, C, D, E (not shown). However, the detecting carrier 10 could be divided into different numbers of the regional positions with different areas to meet various requirements, wherein the biological particles are randomly distributed on the regional positions, so that some regional positions have at least one kind of the target biological particles, and some regional positions do not have the target biological particles; the user could also select different labels, different fluorescents, and different light filters to identify the target biological particles. In step D, the photomultiplier tube 42 and the detecting carrier 10 move relatively to respectively scan the regional positions A, B, C, D, and E to detect at least one kind of the target biological particles.

During a process of executing the another detecting method Y, when the emission light Lb generated by exciting the label on at least one of the target biological particles by the excitation light La is detected by the photomultiplier tube 42 in one of the regional positions (e.g. a regional position A) on the detecting carrier 10, the photomultiplier tube 42 generates a regional positioning signal to record a position and an intensity of the fluorescent signal of the regional position A, and transmits the information of the regional positioning signal to the processor. The photomultiplier tube 42 continuously moves between other regional positions B, C, D, and E on the detecting carrier 10 until all of the regional positions are scanned. Then, the processor determines that the regional position A on the detecting carrier 10 has at least one kind of the target biological particles based on the regional positioning signal, and the regional positioning signal including the location information of the regional position A is transmitted to the charge-coupled device 44. The charge-coupled device 44 moves relative to the detecting carrier 10 to the regional position A based on the regional positioning signal and receives the second detecting light L2 to detect the image position of the at least one kind of target biological particles in the regional position A to generate an image signal. The processor obtains the precise location of the at least one kind of target biological particles in the regional position A on the detecting carrier 10 based on the image signal. In this way, the efficiency of scanning detection could be improved by using the photomultiplier tube 42 to quickly finish the scan of all regional positions and then using the charge-coupled device 44 to confirm whether in the field of view of at least one of the regional positions with the fluorescent signal has the target biological particles.

During a process of executing the another detecting method Y, when the emission light Lb generated by exciting the label on the target biological particles by the excitation light La is detected by the photomultiplier tube 42 respectively in the regional positions A and B on the detecting carrier 10, the photomultiplier tube 42 generates two regional positioning signals and transmits the two regional positioning signals to the processor, and continuously moves between others regional positions C, D, and E on the detecting carrier 10 until all of the regional positions are scanned, wherein each of the two regional positioning signals includes a location information and a fluorescent signal intensity of each of the regional positions A and B. Then, the processor determines that the regional positions A and B on the detecting carrier 10 respectively have at least one kind of the target biological particles based on the two regional positioning signals, and the two regional positioning signals including the location information of the regional positions A and B are transmitted to the charge-coupled device 44. The charge-coupled device 44 respectively moves relative to the detecting carrier 10 to the regional positions A and B based on the two regional positioning signals and respectively receives the second detecting light L2 to detect the image position of at least one kind of the target biological particles in the regional positions A and B to respectively generate an image signal. The processor respectively obtains the precise location of at least one kind of the target biological particles in the regional positions A and B on the detecting carrier 10 based on the two image signals.

The optical system of the detecting device 100 forms a first light path S1 (FIG. 2) and a second light path S2 (FIG. 3) for spreading the energy of the excitation light La and the energy of the emission light Lb based on steps A-G of the detecting method, thereby obtaining the precise location of at least one kind of the target biological particles.

Referring to FIG. 2, the first light path S1 starts from the excitation light source 20, and passes through the dichroic mirror 34, the objective 32, the detecting carrier 10, the objective 32, the dichroic mirror 34, and the filter set 36 in sequence, and then penetrates through the beam splitter 38 to reach the photomultiplier tube 42. After the photomultiplier tube 42 receives the first detecting light L1 transmitted on the first light path S1, which regional positions on the detecting carrier 10 has the at least one kind of target biological particles could be quickly determined, thereby obtaining the regional positions of the at least one kind of target biological particles.

Referring to FIG. 3, the second light path S2 starts from the excitation light source 20, and passes through the dichroic mirror 34, the objective 32, the detecting carrier 10, the objective 32, the dichroic mirror 34, and the filter set 36 in sequence, and then is reflected by the beam splitter 38 to reach the charge-coupled device 44. After the charge-coupled device 44 receives the second detecting light L2 transmitted on the second light path S2, the precise location of the at least one kind of target biological particles could be accurately obtained. In this way, the processor could determine the precise location of the at least one kind of target biological particles via the photomultiplier tube 42 and the charge-coupled device 44, and then the processor could control other devices to select the at least one kind of target biological particles.

In the current embodiment, the ratio of the first detecting light L1 to the emission light Lb is 0.1, and the ratio of the second detecting light L2 to the emission light Lb is 0.9. However, the beam splitter with different penetration rates and different reflectivity could be adopted in other embodiments. For instance, adopting a beam splitter with a penetration rate of 20% and a reflectivity of 80%, wherein the ratio of the first detecting light L1 to the emission light Lb is 0.2, and the ratio of the second detecting light L2 to the emission light Lb is 0.8; or, adopting a beam splitter with a penetration rate of 50% and a reflectivity of 50%, wherein the ratio of the first detecting light L1 to the emission light Lb is 0.5, and the ratio of the second detecting light L2 to the emission light Lb is 0.5. However, the values of the penetration rate, the reflectivity, and the ratio are not limited by the values as exemplified above.

Figure 4:
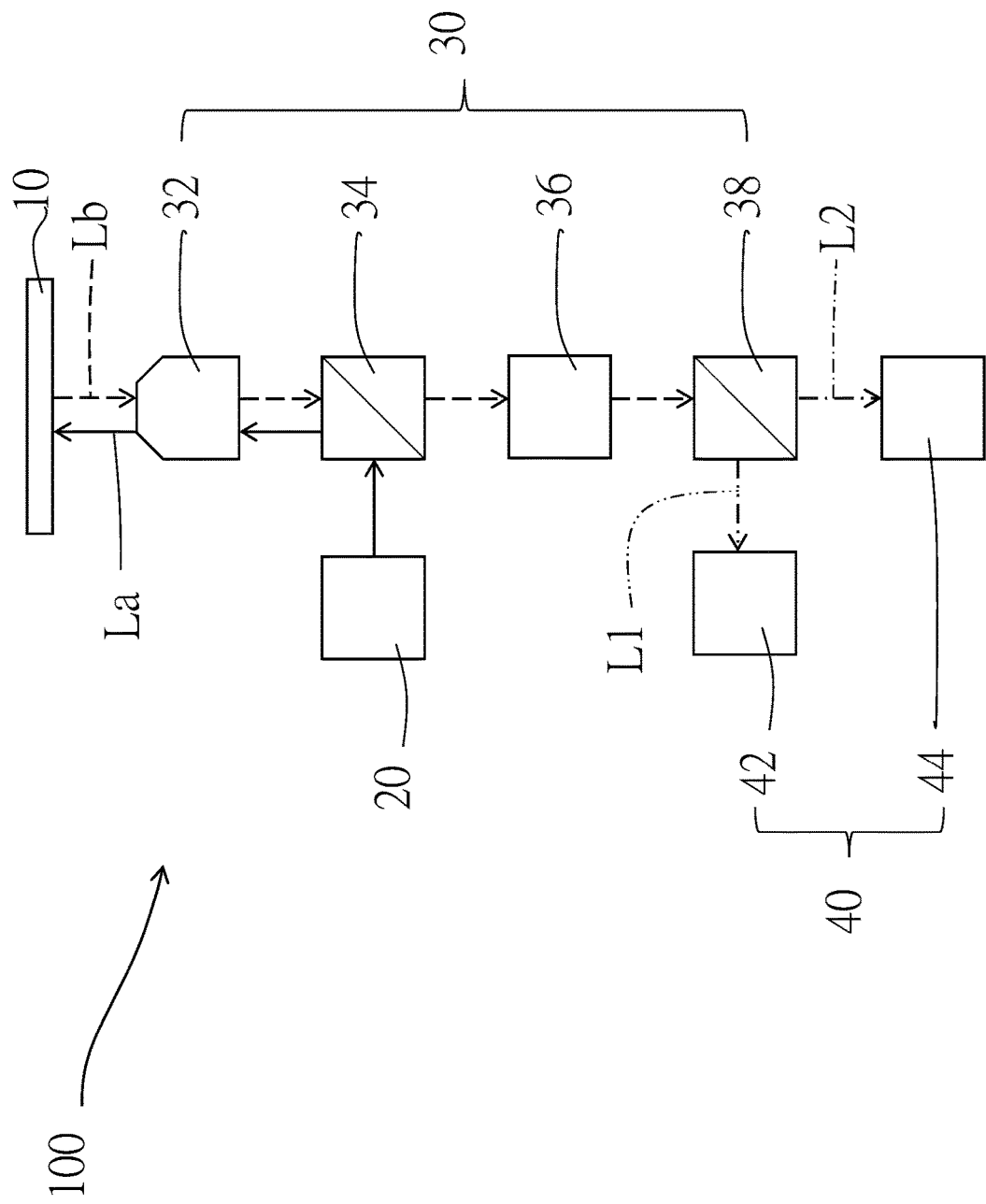
FIG. 4 is a schematic view, showing alternatives of the detecting device according to the first embodiment.

In the current embodiment, an alternative of the beam splitter 38 and the scanning sensor group 40 are illustrated in FIG. 4, wherein a penetration rate of the beam splitter 38 is 90%, and a reflectivity of the beam splitter 38 is 10%. The 10% emission light Lb reflected by the mirror of the beam splitter 38 is the first detecting light L1, and the 90% emission light Lb penetrating through the beam splitter 38 is the second detecting light L2. Similarly, the photomultiplier tube 42 of the scanning sensor group 40 receives the first detecting light L1, and the charge-coupled device 44 receives the second detecting light L2.

Figure 5:
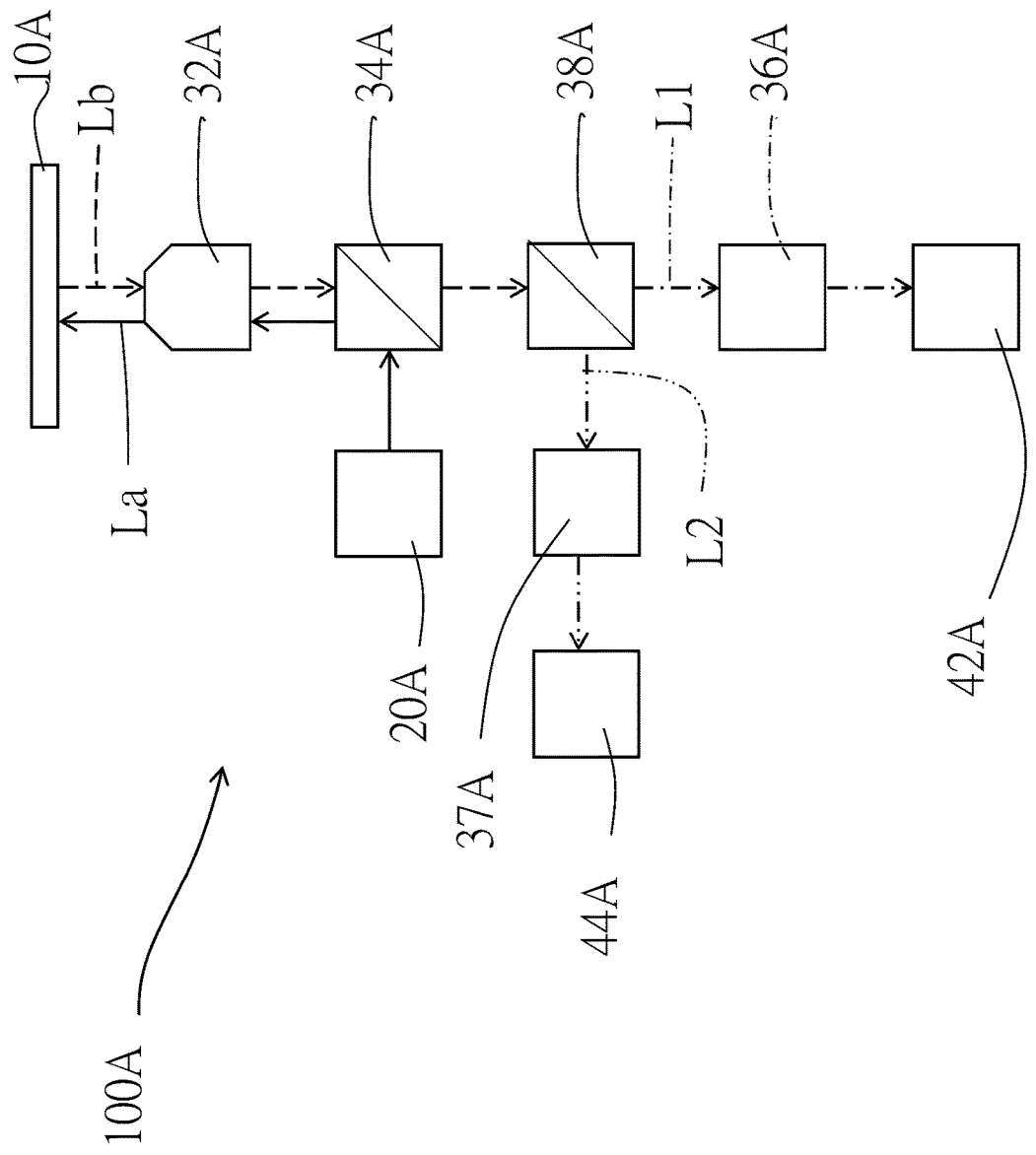
FIG. 5 is a schematic view of the detecting device for detecting biological particles according to a second embodiment of the present invention.

A detecting device 100A according to a second embodiment of the present invention is illustrated in FIG. 5, wherein the difference between the detecting device 100A of the second embodiment and that of the first embodiment is that the filter set disposed between the dichroic mirror and the beam splitter is omitted, and an optical system of the detecting device 100A includes a first filter set 36A and a second filter set 37A. A beam splitter 38A is located on a light path of the emission light Lb and separates the emission light Lb into the first detecting light L1 and the second detecting light L2 to emit, and the first filter set 36A and the second filter set 37A are respectively located on a light path of the first detecting light L1 and a light path of the second detecting light L2. In this way, compared with the detecting method X or Y of the first embodiment during executing step C, a detecting method includes a step between step C and step D after the beam splitter 38A of the second embodiment divides the emission light Lb into the first detecting light L1 and the second detecting light L2 to emit, wherein the step between step C and step D includes following steps:

the first filter set 36A selects one of the light filters that could only be penetrated by a waveband of the first detecting light L1, and filters out the excitation light La or lights with other wavebands, and then the first detecting light L1 enters the photomultiplier tube 42A; and the second filter set 37A selects one of the light filters that could only be penetrated by a waveband of the second detecting light L2, and filters out the excitation light La or lights with other wavebands, and then the second detecting light L2 enters the charge-coupled device 44A.

With the aforementioned design, the first light path received by the photomultiplier tube 42A starts from an excitation light source 20A, and passes through a dichroic mirror 34A, an objective 32A, a detecting carrier 10A, the objective 32A, and the dichroic mirror 34A in sequence, and then penetrates through the beam splitter 38A to be filtered by the first filter set 36A to reach the photomultiplier tube 42A; the second light path received by the charge-coupled device 44A starts from the excitation light source 20A, and passes through the dichroic mirror 34A, the objective 32A, the detecting carrier 10A, the objective 32A, and the dichroic mirror 34A, and is reflected by the beam splitter 38A and is filtered by the second filter set 37A to reach the charge-coupled device 44A, wherein the first filter set 36A and the second filter set 37A could be replaced to meet various requirements (i.e., allowing light with at least one specific waveband to penetrate and to eliminate lights with other wavebands), which provides advantages of that the photomultiplier tube 42A and the charge-coupled device 44A could simultaneously view different kinds of target biological particles depending on the required demand.

When using the detecting device 100A of the current embodiment, after the photomultiplier tube 42A receives the first detecting light L1 in one of the regional positions on the detecting carrier 10 and the charge-coupled device 44A receives the second detecting light L2, the light filter of the second filter set 37A could be replaced to another light filter that could detect other fluorescent particle labels. In this way, whether the regional positions have any of the target biological particles combined with another type of label could be observed, so that the photomultiplier tube 42A and the charge-coupled device 44A could simultaneously view different kinds of target biological particles, which helps to reduce the time for switching light filters.

Figure 6:
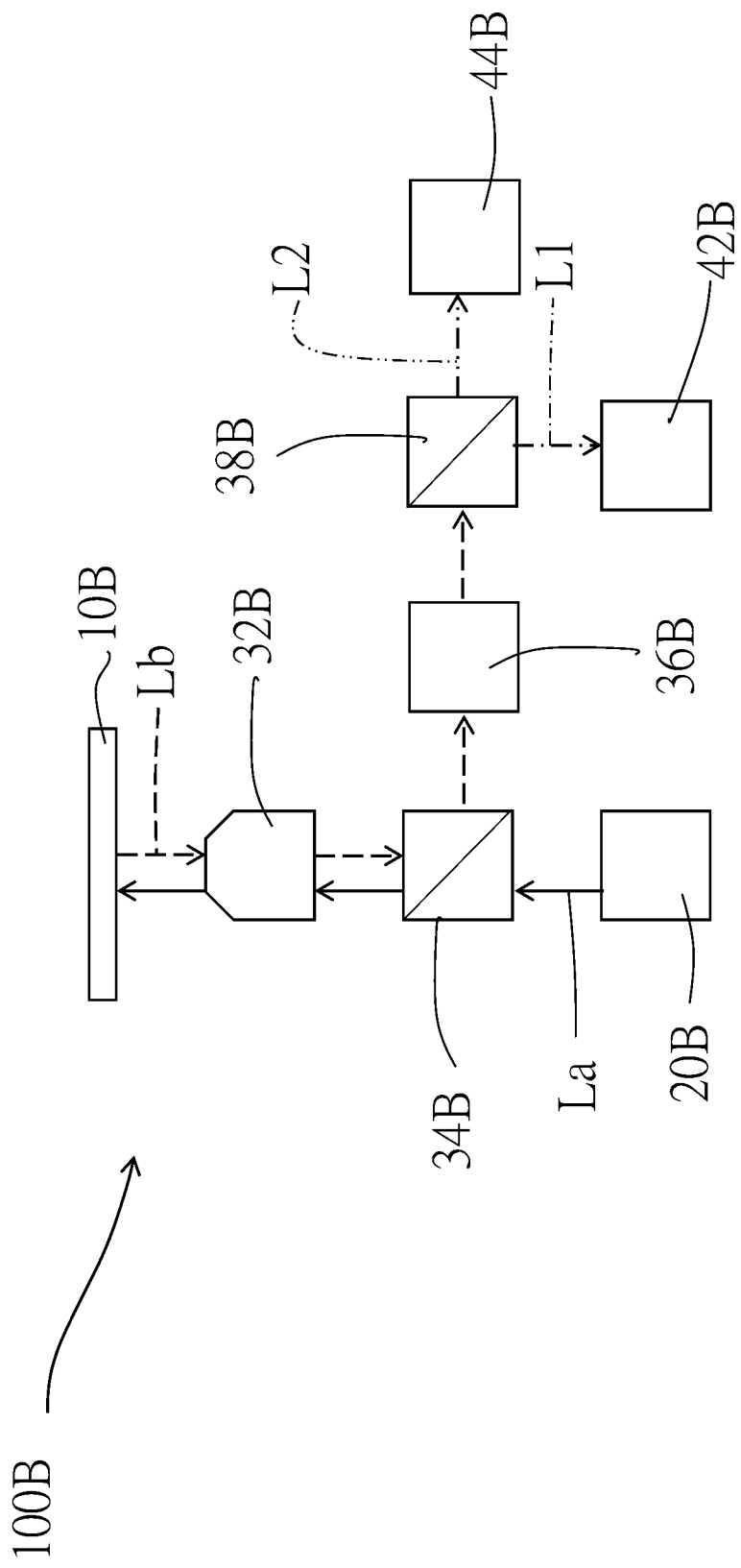
FIG. 6 is a schematic view of the detecting device for detecting biological particles according to a third embodiment of the present invention.

A detecting device 100B according to a third embodiment of the present invention is illustrated in FIG. 6, wherein the difference between the detecting device 100B of the third embodiment and that of the first embodiment is that a disposition of each component of the filter and spectroscope group is different, which also affects a disposition of an excitation light source 20B, a photomultiplier tube 42B, and a charge-coupled device 44B.

An objective 32B and a dichroic mirror 34B of the filter and spectroscope group of the detecting device 100B are sequentially disposed below a detecting carrier 10B from top down, and both of a filter set 36B and a beam splitter 38B are disposed on the same side of a mirror of the dichroic mirror 34B, and the filter set 36B is located between the dichroic mirror 34B and the beam splitter 38B. The excitation light source 20B is disposed below the dichroic mirror 34B. The photomultiplier tube 42B is disposed below the beam splitter 38B. The charge-coupled device 44B is disposed on a side of the beam splitter 38B opposite to the filter set 36B. However, since the ratio of the penetration rate and the reflectivity of the beam splitter 38B varies depending on different requirements, the beam splitter, the photomultiplier tube, and the charge-coupled device of the present invention could be used together according to following principles: the beam splitter of the present invention divides the emission light into a penetrating light and a reflected light, wherein either the penetrating light or the reflected light, which have a lower energy, is taken as the first detecting light of the present invention, and the other one of the penetrating light or the reflected light, which have a higher energy, is taken as the second detecting light of the present invention, and the photomultiplier tube always receives the first detecting light, and the charge-coupled device always receives the second detecting light.

A detecting method X of the detecting device 100B of the third embodiment includes following steps A-G:

Step A: the excitation light source 20 emits the excitation light La, and the excitation light La penetrates through both of the dichroic mirror 34B and the objective 32B and illuminates the biological particles;

Step B: the at least one kind of target biological particles in the biological particles absorbs the excitation light La to generate the emission light Lb, and the emission light Lb enters the filter and spectroscope group;

a step between step B and step C: the emission light Lb passes through the objective 32B of the filter and spectroscope group and goes into the dichroic mirror 34B, and the dichroic mirror 34B reflects the emission light Lb to the filter set 36B; then, the filter set 36B selects one of the light filters that could only be penetrated by a waveband of the emission light Lb, and filters out the excitation light La or lights with other wavebands, so that the emission light Lb enters the beam splitter 38B again;

Step C: the beam splitter 38B of the filter and spectroscope group separates the emission light Lb into the first detecting light L1 and the second detecting light L2 to emit, and the first detecting light L1 and the second detecting light L2 respectively enter the photomultiplier tube 42B and the charge-coupled device 44B;

Step D: the photomultiplier tube 42B and the detecting carrier 10B move relatively to scan the regional positions on the detecting carrier 10B; when the photomultiplier tube 42B receives the first detecting light L1 in one of the regional positions of the detecting carrier 10B, the photomultiplier tube 42B generates a regional positioning signal and transmits the regional positioning signal to the processor, wherein regional positioning signal includes the intensity of the fluorescent signal of the at least one kind of target biological particles on the detecting carrier 10B;

Step E: the processor determines that the regional positions on the detecting carrier 10B have the at least one kind of target biological particles based on the regional positioning signal, and transmits the regional positioning signal to the charge-coupled device 44B;

Step F: the charge-coupled device 44B receives the second detecting light L2 to detect the image position of the at least one kind of target biological particles in the regional positions, thereby generating an image signal;

Step G: the processor obtains a precise location of the at least one kind of target biological particles in the regional positions on the detecting carrier 10 based on the image signal, and then returns to step D to scan other regional positions on the detecting carrier 10 which are not detected.

Another detecting method Y of the detecting device 100B of the third embodiment includes following steps A-G:

Step A: the excitation light source 20 emits the excitation light La, and the excitation light La penetrates through both of the dichroic mirror 34B and the objective 32B and illuminates the biological particles;

Step B: the at least one kind of target biological particles in the biological particles absorbs the excitation light La to generate the emission light Lb, and the emission light Lb enters the filter and spectroscope group;

a step between step B and step C: the emission light Lb passes through the objective 32B of the filter and spectroscope group and goes into the dichroic mirror 34B, and the dichroic mirror 34B reflects the emission light Lb to the filter set 36B; then, the filter set 36B selects one of the light filters that could only be penetrated by a waveband of the emission light Lb, and filters out the excitation light La or lights with other wavebands, so that the emission light Lb enters the beam splitter 38B again;

Step C: the beam splitter 38B of the filter and spectroscope group separates the emission light Lb into the first detecting light L1 and the second detecting light L2 to emit, and the first detecting light L1 and the second detecting light L2 respectively enter the photomultiplier tube 42B and the charge-coupled device 44B;

Step D: the photomultiplier tube 42B and the detecting carrier 10B move relatively to scan the regional positions on the detecting carrier 10B; when the photomultiplier tube 42B receives the first detecting light L1 in one of the regional positions of the detecting carrier 10B, the photomultiplier tube 42B generates a regional positioning signal and transmits the regional positioning signal to the processor until all of the regional positions are scanned, wherein the regional positioning signal includes the regional position and the intensity of the fluorescent signal of the at least one kind of target biological particles on the detecting carrier 10B;

Step E: the processor determines that at least one of the regional positions on the detecting carrier 10B has the at least one kind of target biological particles based on at least one of the regional positioning signals, and transmits at least one of the regional positioning signals to the charge-coupled device 44B;

Step F: the charge-coupled device 44B moves relative to the detecting carrier 10B based on at least one of the regional positioning signals, and receives the second detecting light L2 in each of the regional positions to detect the image position of the at least one kind of target biological particles on the detecting carrier 10B, thereby respectively generating an image signal;

Step G: the processor obtains a precise location of the at least one kind of target biological particles in at least one of the regional positions on the detecting carrier 10B based on at least one of the image signals.

With the aforementioned design, compared with the detecting device 100 of the first embodiment, an overall height of the detecting device 100B of the third embodiment is lower, and an overall width of the detecting device 100B of the third embodiment is larger, which would be more suitable for placing in a relatively short and wide receiving space, and buyers could choose depending on the required demand.

Figure 7:
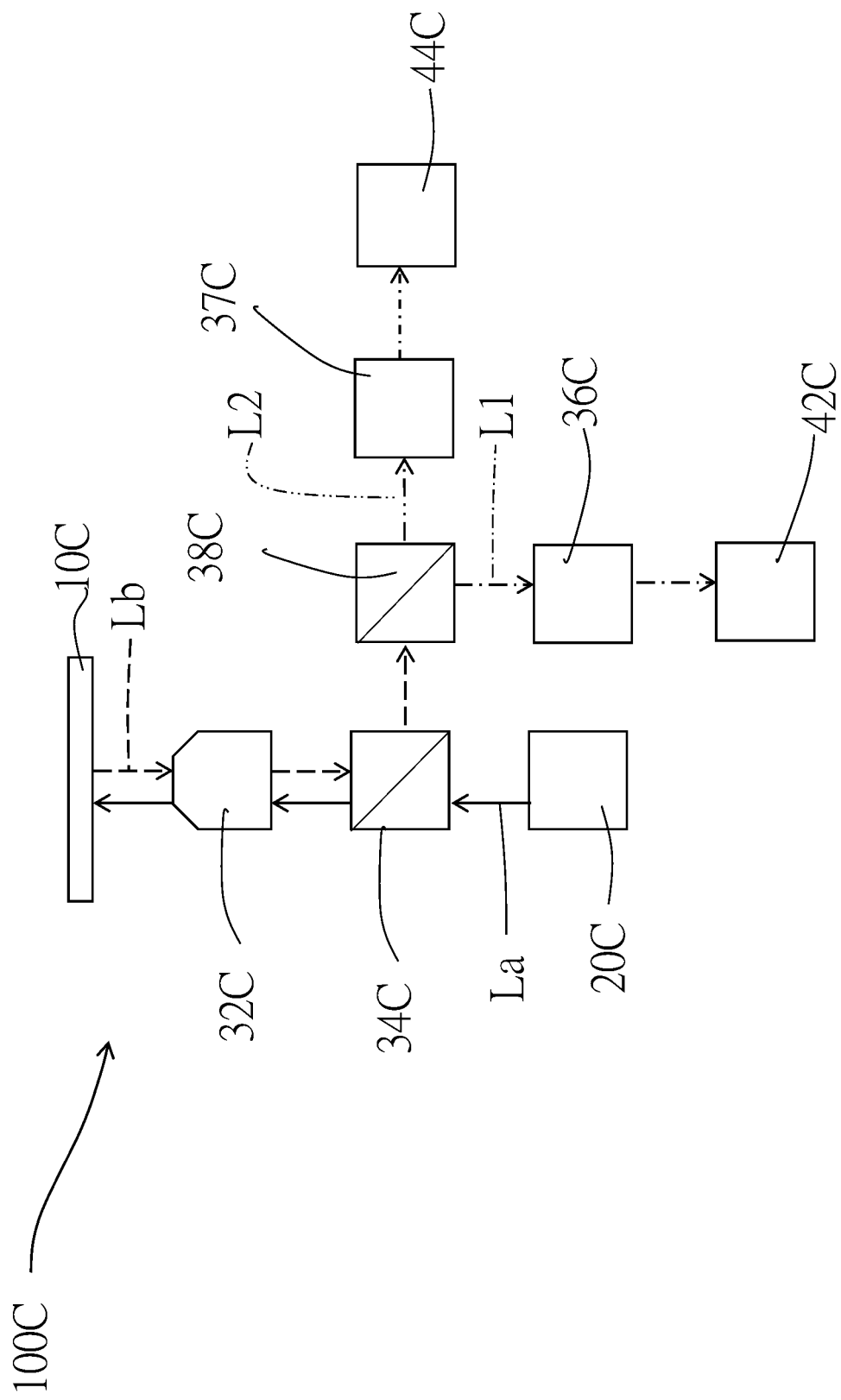
FIG. 7 is a schematic view of the detecting device for detecting biological particles according to a fourth embodiment of the present invention.

A detecting device 100C according to a fourth embodiment of the present invention is illustrated in FIG. 7, wherein the difference between the detecting device 100C of the fourth embodiment and that of the third embodiment is that the filter set disposed between the dichroic mirror and the beam splitter is omitted, and the filter and spectroscope group of the detecting device 100C includes a first filter set 36C and a second filter set 37C. A beam splitter 38C is located on a light path of the emission light Lb. The first filter set 36C and the second filter set 37C are respectively located on a light path of the first detecting light L1 received by a photomultiplier tube 42C and a light path of the second detecting light L2 received by a charge-coupled device 44C.

In this way, a detecting method of the detecting device 100C of the fourth embodiment has almost the same steps as that of the detecting device 100A of the second embodiment, except that a following step will be taken in step A of the detecting method of the detecting device 100C of the fourth embodiment: the excitation light source 20C emits the excitation light La, and the excitation light La penetrates through both of the dichroic mirror 34C and the objective 32C and illuminates the biological particles on a detecting carrier 10C.

The first filter set 36C and the second filter set 37C could be replaced to meet various requirements (i.e., allowing light with at least one specific waveband to penetrate and to eliminate lights with other wavebands), which provides advantages of that the photomultiplier tube 42C and the charge-coupled device 44C could simultaneously view different kinds of target biological particles depending on the required demand.

When using the detecting device 100C of the current embodiment, after the photomultiplier tube 42C receives the first detecting light L1 in one of the regional positions on the detecting carrier 10 and the charge-coupled device 44A receives the second detecting light L2, the light filter of the second filter set 37C could be replaced to another light filter that could detect other fluorescent particle labels. In this way, whether the regional positions have any of the target biological particles combined with another type of label could be observed, so that the photomultiplier tube 42C and the charge-coupled device 44C could simultaneously view different kinds of target biological particles, which helps to reduce the time for switching light filters. In addition, the detecting device 100C of the current application also has the same advantage as that of the detecting device 100B of the third embodiment (i.e., being more suitable for placing in a relatively short and wide receiving space).

Figure 8:
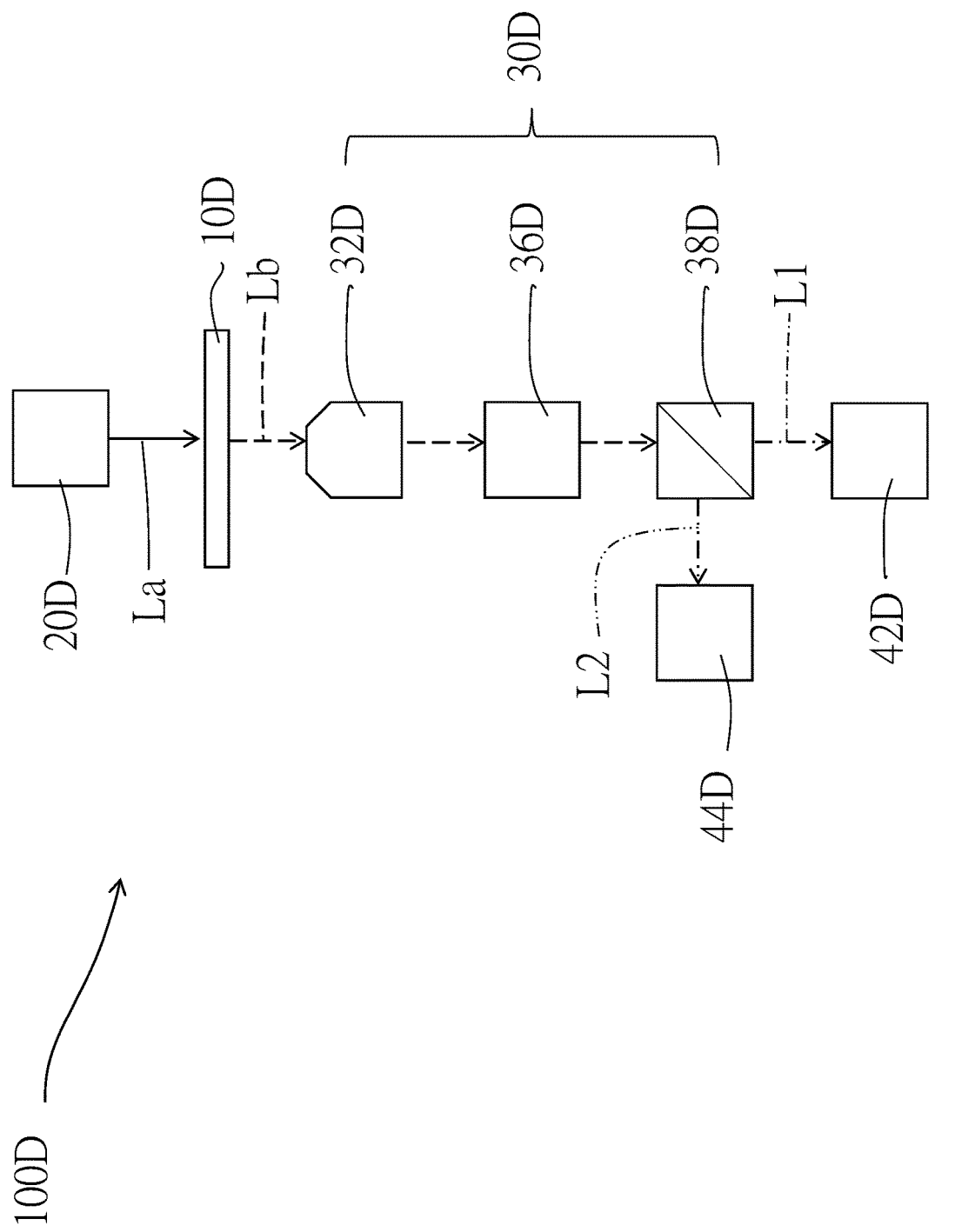
FIG. 8 is a schematic view of the detecting device for detecting biological particles according to a fifth embodiment of the present invention.

A detecting device 100D according to a fifth embodiment of the present invention is illustrated in FIG. 8, wherein the difference between the detecting device 100D of the fifth embodiment and that of the first embodiment is that an excitation light source 20D and an objective 32D are respectively disposed on two opposite sides of a detecting carrier 10D, wherein the detecting carrier 10D is located on a light path of the excitation light La of the excitation light source 20D, thereby the excitation light La directly illuminates the biological particles. In this way, the filter and spectroscope group of the detecting device 100D does not need to provide the dichroic mirror for reflecting the excitation light La, wherein the objective 32D, a filter set 36D, and a beam splitter 38D of the filter and spectroscope group are sequentially disposed below the detecting carrier 10D from top down.

A detecting method X of the detecting device 100D of the current embodiment includes following steps A-G:
Step A: the excitation light source 20D emits the excitation light La, and the excitation light La directly illuminates the biological particles;
Step B: the at least one kind of target biological particles in the biological particles absorbs the excitation light La to generate the emission light Lb, and the emission light Lb goes into the filter and spectroscope group 30D;
a step between step B and step C: the emission light Lb passes through the objective 32D of the filter and spectroscope group 30D and goes into the filter set 36D; then, the filter set 36D selects one of the light filters that could only be penetrated by a waveband of the emission light Lb, and filters out the excitation light La or lights with other wavebands, so that the emission light Lb enters the beam splitter 38D again;
Step C: the beam splitter 38D separates the emission light Lb into the first detecting light L1 and the second detecting light L2 to emit, and the first detecting light L1 and the second detecting light L2 respectively enter the photomultiplier tube 42D and the charge-coupled device 44D;
Step D: the photomultiplier tube 42D and the detecting carrier 10D move relatively to scan at least one of the regional positions; when the photomultiplier tube 42D receives the first detecting light L1 in one of the regional positions of the detecting carrier 10D, the photomultiplier tube 42D generates a regional positioning signal and transmits the regional positioning signal to the processor, wherein the regional positioning signal includes the intensity of the fluorescent signal of the at least one kind of target biological particles on the detecting carrier 10D;
Step E: the processor determines that the regional positions on the detecting carrier 10D have the at least one kind of target biological particles based on the regional positioning signal, and transmits the regional positioning signal to the charge-coupled device 44D;
Step F: the charge-coupled device 44D receives the second detecting light L2 to detect the image position of the at least one kind of target biological particles in the regional positions, thereby generating an image signal;
Step G: the processor obtains a precise location of the at least one kind of target biological particles in the regional positions on the detecting carrier 10D based on the image signal, and then returns to step D to scan other regional positions on the detecting carrier 10D which are not detected.

Another detecting method Y of the detecting device 100D of the current embodiment includes following steps A-G:
Step A: the excitation light source 20D emits the excitation light La, and the excitation light La directly illuminates the biological particles;
Step B: the at least one kind of target biological particles in the biological particles absorbs the excitation light La to generate the emission light Lb, and the emission light Lb enters the filter and spectroscope group 30D;
a step between step B and step C: the emission light Lb passes through the objective 32D of the filter and spectroscope group 30D and goes into the filter set 36D; then, the filter set 36D selects one of the light filters that could only be penetrated by a waveband of the emission light Lb, and filters out the excitation light La or lights with other wavebands, so that the emission light Lb enters the beam splitter 38D again;
Step C: the beam splitter 38D separates the emission light Lb into the first detecting light L1 and the second detecting light L2 to emit, and the first detecting light L1 and the second detecting light L2 respectively enter the photomultiplier tube 42D and the charge-coupled device 44D;
Step D: the photomultiplier tube 42D and the detecting carrier 10D move relatively to scan the regional positions on the detecting carrier 10D; when the photomultiplier tube 42D receives the first detecting light L1 in one of the regional positions of the detecting carrier 10D, the photomultiplier tube 42D generates a regional positioning signal and transmits the regional positioning signal to the processor until all of the regional positions are scanned, wherein the regional positioning signal includes a regional position and an intensity of the fluorescent signal of the at least one kind of target biological particles on the detecting carrier 10D;
Step E: the processor determines that at least one of the regional positions on the detecting carrier 10D has the at least one kind of target biological particles based on at least one of the regional positioning signals, and transmits at least one of the regional positioning signals to the charge-coupled device 44D;
Step F: the charge-coupled device 44D moves relative to the detecting carrier 10D based on at least one of the regional positioning signals, and receives the second detecting light L2 in each of the regional positions to detect the image position of the at least one kind of target biological particles on the detecting carrier 10D, thereby respectively generating an image signal;
Step G: the processor obtains a precise location of the at least one kind of target biological particles in at least one of the regional positions on the detecting carrier 10D based on at least one of the image signals.

The advantages of the detecting device 100D of the fifth embodiment are that: the filter and spectroscope group 30D does not locate behind the dichroic mirror, thereby reducing an impact on the emission light Lb and avoiding an energy loss of the emission light Lb which leads to a degradation of the scanning and detecting quality. Additionally, the excitation light source 20D, the detecting carrier 10D, and the filter and spectroscope group 30D of the detecting device 100D of the current embodiment could move relative to one another, which increases a freedom of movement of machine.

Figure 9:
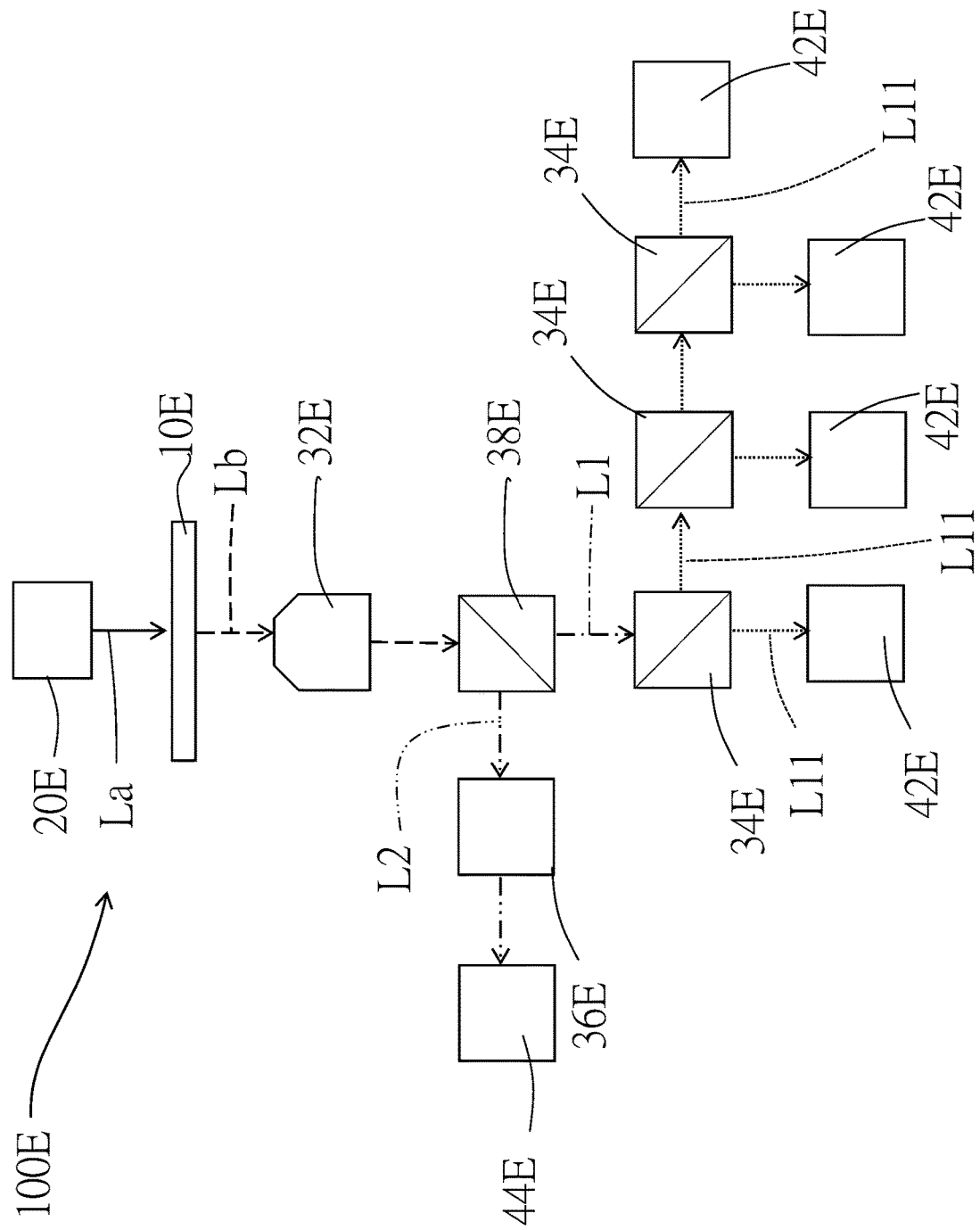
FIG. 9 is a schematic view of the detecting device for detecting biological particles according to a sixth embodiment of the present invention.

A detecting device 100E according to a sixth embodiment of the present invention is illustrated in FIG. 9, wherein the difference between the detecting device 100E of the sixth embodiment and that of the fifth embodiment is that a filter and spectroscope group of the detecting device 100E includes an objective 32E, three dichroic mirrors 34E, a filter set 36E, and a beam splitter 38E, and a scanning sensor group of the detecting device 100E includes four photomultiplier tubes 42E and a charge-coupled device 44E, wherein the objective 32E and the beam splitter 38E are sequentially disposed below a detecting carrier 10E from top down. One of the dichroic mirrors 34E is disposed below the beam splitter 38E and is located on a light path of the first detecting light L1 for separating the incident first detecting light L1 into a plurality of first detecting light wavebands L11 with different wavebands to emit. The other two of the dichroic mirrors 34E are arranged on a side of the dichroic mirror 34E disposed below the beam splitter 38E for receiving at least one of the first detecting light wavebands L11. In this way, each of the photomultiplier tubes 42E could respectively generate a regional positioning signal, and those regional positioning signals respectively represent different kinds of the target biological particles in the regional positions on the detecting carrier 10E.

For instance, the biological particles on the detecting carrier 10E include a plurality of kinds of target biological particles, and one of the plurality of kinds of target biological particles could be engaged with different types of labels at the same time, or the plurality of kinds of target biological particles could be respectively engaged with different types of labels. By replacing the excitation light emitted by the excitation light source, the labels on the detecting carrier 10E could be excited, and those labels which are excited could respectively emit different emission lights. When the photomultiplier tubes 42E respectively receive different emission lights, each of the photomultiplier tubes 42E could respectively generate a regional positioning signal, which represents that one kind of the target biological particles in one of the regional positions on the detecting carrier 10E could be engaged with multiple different fluorescent particle labels at the same time, or multiple different target biological particles could be engaged with different fluorescent particle labels. In this way, during a process of scanning and detecting, whether there are different fluorescent labels in a certain regional position on the detecting carrier 10E could be simultaneously checked.

A detecting method X of the detecting device 100E of the sixth embodiment includes following steps A-G:

Step A: the excitation light source 20E emits the excitation light La, and the excitation light La directly illuminates the biological particles;

Step B: the at least one kind of target biological particles in the biological particles absorbs the excitation light La to generate the emission light Lb, and the emission light Lb goes into the filter and spectroscope group;

a step between step B and step C: the emission light Lb passes through the objective 32E of the filter and spectroscope group and goes into the beam splitter 38E;

Step C: the beam splitter 38E separates the emission light Lb into the first detecting light L1 and the second detecting light L2 to emit, and the different first detecting light wavebands L11 of the first detecting light L1 respectively enter the photomultiplier tubes 42E; the filter set allows the waveband of the second detecting light L2 to penetrate through the light filters, and filters out the excitation light La or lights with other wavebands, so that the emission light Lb enters the charge-coupled device 44E again;

Step D: the photomultiplier tubes 42E and the detecting carrier 10E move relatively to scan the regional positions on the detecting carrier 10E; when the photomultiplier tubes 42E receive the first detecting light L1 in one of the regional positions of the detecting carrier 10E, the photomultiplier tubes 42E generate a regional positioning signal and transmits the regional positioning signal to the processor, wherein the regional positioning signal includes the intensity of the fluorescent signal of the at least one kind of target biological particles on the detecting carrier 10E;

Step E: the processor determines that at least one of the regional positions on the detecting carrier 10E has the at least one kind of target biological particles based on the regional positioning signal, and transmits the regional positioning signal to the charge-coupled device 44E;

Step F: the charge-coupled device 44E receives the second detecting light L2 to detect the image position of the at least one kind target biological particles on at least one of the regional positions, thereby generating at least one of the image signal image signals;

Step G: the processor obtains a precise location of the at least one kind of target biological particles in the regional positions on the detecting carrier 10E based on the image signal, and then returns to step D to scan other regional positions on the detecting carrier 10E which are not detected.

Another detecting method Y of the detecting device 100E of the current embodiment includes following steps A-G:

Step A: the excitation light source 20E emits the excitation light La, and the excitation light La directly illuminates the biological particles;

Step B: the at least one kind of target biological particles in the biological particles absorbs the excitation light La to generate the emission light Lb, and the emission light Lb enters the filter and spectroscope group;

a step between step B and step C: the emission light Lb passes through the objective 32E of the filter and spectroscope group and goes into the beam splitter 38E;

Step C: the beam splitter 38E separates the emission light Lb into the first detecting light L1 and the second detecting light L2 to emit, and the different first detecting light wavebands L11 of the first detecting light L1 respectively enter the photomultiplier tubes 42E; the filter set allows the waveband of the second detecting light L2 to penetrate through the light filters, and filters out the excitation light La or lights with other waveband, so that the emission light Lb enters the charge-coupled device 44E again;

Step D: the photomultiplier tubes 42E and the detecting carrier 10E move relatively to scan the regional positions on the detecting carrier 10E; when the photomultiplier tubes 42E receive the first detecting light L1 in one of the regional positions of the detecting carrier 10E, the photomultiplier tubes 42E generate a regional positioning signal and transmits the regional positioning signal to the processor until all of the regional positions are scanned, wherein the regional positioning signal includes the regional position and the intensity of the fluorescent signal of the at least one kind of target biological particles on the detecting carrier 10E;

Step E: the processor determines that at least one of the regional positions on the detecting carrier 10E has the at least one kind of target biological particles based on at least one of the regional positioning signals, and transmits at least one of the regional positioning signals to the charge-coupled device 44E; Step F: the charge-coupled device 44E moves relative to the detecting carrier 10E based on at least one of the regional positioning signals, and receives the second detecting light L2 in each of the regional positions to detect the image position of the at least one kind of target biological particles on the detecting carrier 10E, thereby respectively generating an image signal;

Step G: the processor obtains a precise location of the at least one kind of target biological particles in at least one of the regional positions on the detecting carrier 10E based on at least one of the image signals.

Figure 10:
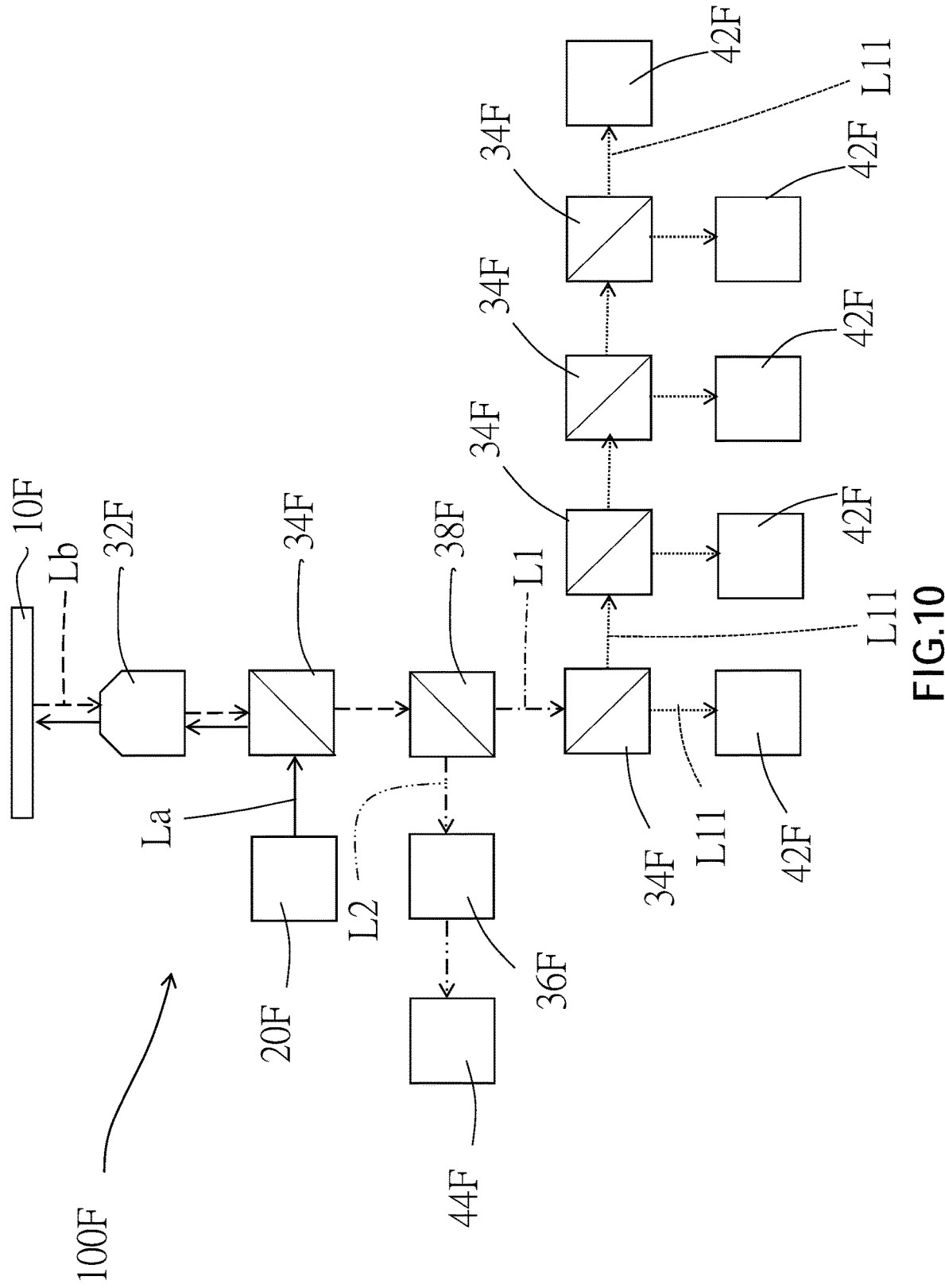
FIG. 10 is a schematic view of the detecting device for detecting biological particles according to a seventh embodiment of the present invention.

A detecting device 100F according to a seventh embodiment of the present invention is illustrated in FIG. 10, wherein the difference between the detecting device 100F of the seventh embodiment and that of the sixth embodiment is that a filter and spectroscope group of the detecting device 100F of the seventh embodiment includes an objective 32F, five dichroic mirrors 34F, and a beam splitter 38F, wherein the objective 32F, one of the dichroic mirrors 34F, the beam splitter 38F, and another one of the dichroic mirrors 34F are sequentially disposed below a detecting carrier 10F from top down. One of the dichroic mirrors 34F disposed above the beam splitter 38F is adapted to reflect the excitation light La of an excitation light source 20F, so that the excitation light La illuminates the biological particles on the detecting carrier 10F. One of the dichroic mirrors 34F disposed below the beam splitter 38F is located on a light path of the first detecting light L1 and is adapted to separate the incident first detecting light L1 into a plurality of first detecting light wavebands L11 with different wavebands to emit. The other three of the dichroic mirrors 34F are arranged on a side of the dichroic mirror 34F located below the beam splitter 38F, and receive at least one of the first detecting light wavebands L11. In this way, a plurality of photomultiplier tubes 42F could respectively generate a regional positioning signal, wherein each of the regional positioning signals could represent different kinds of the target biological particles in the regional positions on the detecting carrier 10F.

For instance, the biological particles on the detecting carrier 10F include a plurality of kinds of target biological particles, and one of the plurality of kinds of target biological particles could be engaged with different types of labels at the same time, or the plurality of kinds of target biological particles could be respectively engaged with different types of labels. By replacing the excitation light emitted by the excitation light source, the labels on the detecting carrier 10F could be excited, and those labels which are excited could respectively emit different emission lights. When the photomultiplier tubes 42F respectively receive different emission lights, each of the photomultiplier tubes 42F could respectively generate a regional positioning signal, which represents that one kind of the target biological particles in one of the regional positions on the detecting carrier 10F could be engaged with multiple different fluorescent particle labels at the same time, or multiple different target biological particles could be engaged with different fluorescent particle labels. In this way, during a process of scanning and detecting, whether there are different fluorescent labels in a certain regional position on the detecting carrier 10F could be simultaneously checked.

In the current embodiment, both of the charge-coupled device 44F and the filter set 36F of the detecting device 100F are disposed on the same side of a mirror of the beam splitter 38F, the filter set 36F allows the waveband of the second detecting light L2 to penetrate therethrough, and filters out the excitation light La or lights with other wavebands, so that the second detecting light L2 enters the charge-coupled device 44F.

With the aforementioned design, compared with the detecting device 100E of the sixth embodiment, the detecting device 100F of the current embodiment could save a space above the detecting carrier 10F and provide more photomultiplier tubes 42F at the same time to know whether there are different kinds of target biological particles in a certain regional position on the detecting carrier 10F. Thereby, a number of the photomultiplier tube and a number of the dichroic mirror corresponding to the photomultiplier tube could increase or decrease to meet various requirements.

Figure 11:
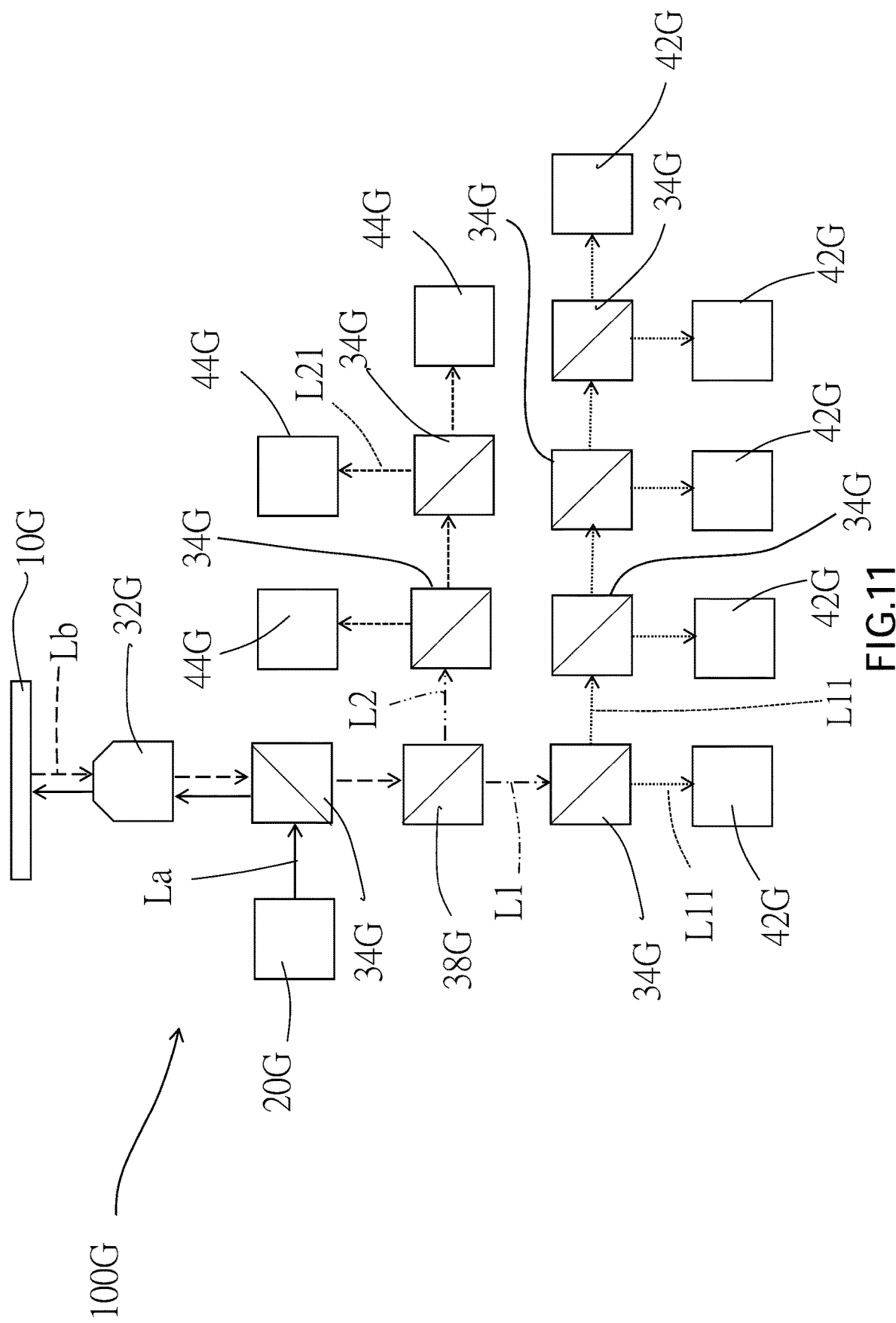
FIG. 11 is a schematic view of the detecting device for detecting biological particles according to an eighth embodiment of the present invention.

A detecting device 100G according to an eighth embodiment of the present invention is illustrated in FIG. 11, wherein the difference between the detecting device 100G of the eighth embodiment and that of the seventh embodiment is that a filter and spectroscope group of the detecting device 100G of the eighth embodiment does not includes the filter set, instead, the filter and spectroscope group of the detecting device 100G further includes two more dichroic mirrors 34G, wherein one of the two dichroic mirrors 34G is disposed on a side of a beam splitter 38G and is located on a light path of the second detecting light L2 for separating the incident second detecting light L2 into a plurality of second detecting light wavebands L21 to emit, and the other of the two dichroic mirror 34G is disposed on a right-side of the dichroic mirror 34G and receives at least one of the second detecting light wavebands L21. A scanning sensor group of the detecting device 100G has a plurality of charge-coupled devices 44G for receiving the second detecting light wavebands L21 with different wavebands and respectively generating an image signal, wherein those image signals could respectively represent an image position of different kinds of the target biological particles on the detecting carrier 10G.

For instance, the biological particles on the detecting carrier 10G include a plurality of kinds of target biological particles, and one of the plurality of kinds of target biological particles could be engaged with different types of labels at the same time, or the plurality of kinds of target biological particles could be respectively engaged with different types of labels. By replacing the excitation light emitted by the excitation light source, the labels on the detecting carrier 10F could be excited, and those labels which are excited could respectively emit different emission lights. When the photomultiplier tubes 42F respectively receive different emission lights, each of the photomultiplier tubes 42F could respectively generate a regional positioning signal, which represents that one kind of the target biological particles in one of the regional positions on the detecting carrier 10F could be engaged with multiple different fluorescent particle labels at the same time, or multiple different target biological particles could be engaged with different fluorescent particle labels. In this way, during a process of scanning and detecting, whether there are different fluorescent labels in a certain regional position on the detecting carrier 10F could be simultaneously checked. During a process of scanning and detecting, the image signals allow the user to view a clear image position of different kinds of target biological particles at the same time via a plurality of different displaying screens. In this way, a workload of each of the charge-coupled devices 44G could be reduced and achieve an effect of receiving different fluorescent label images under a specific field of view.

Figure 12:
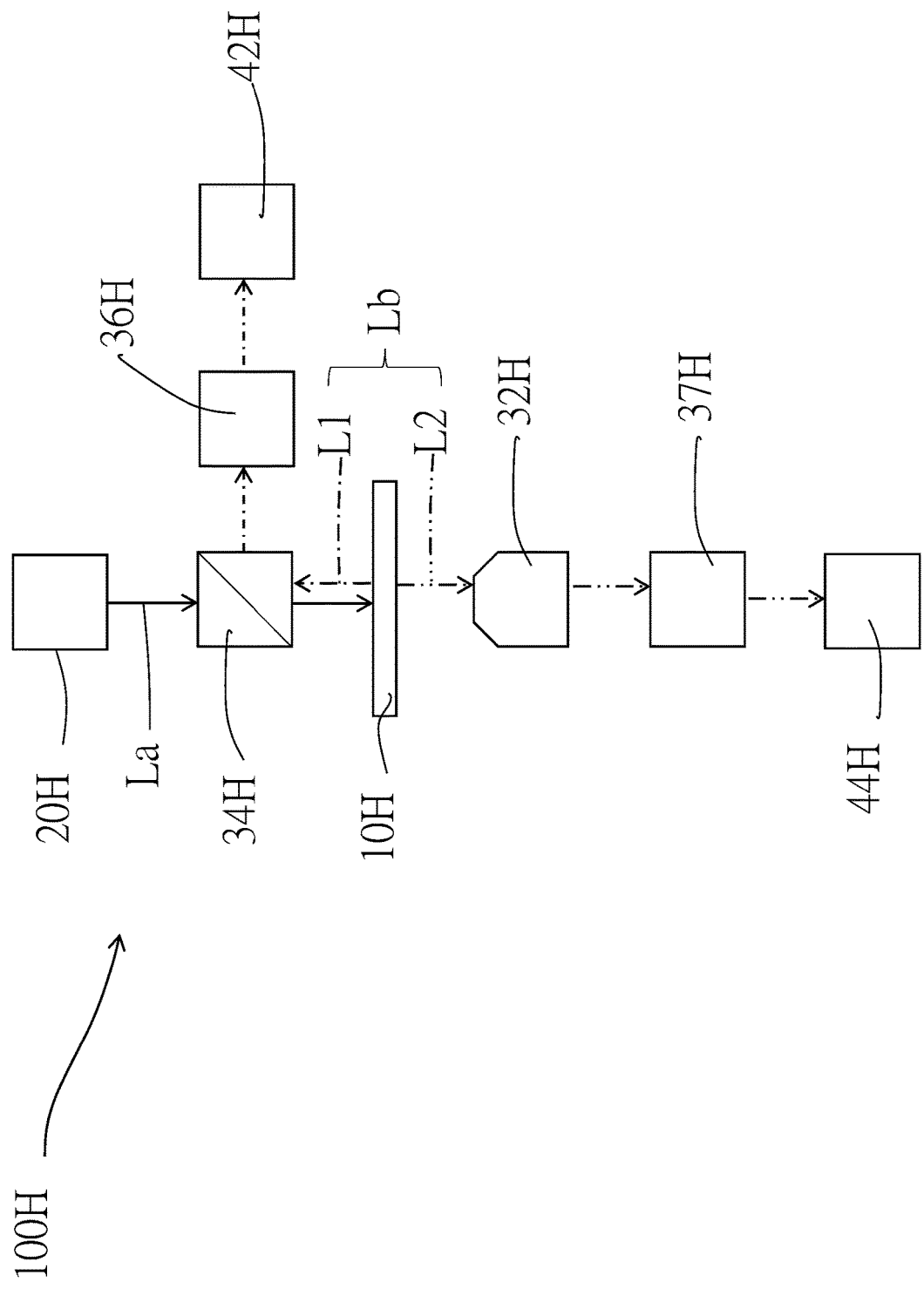
FIG. 12 is a schematic view of the detecting device for detecting biological particles according to a ninth embodiment of the present invention.

In an embodiment, even the filter and spectroscope group of the detecting device does not include the beam splitter, the precise location of the target biological particles could still be obtained by using both of the photomultiplier tube and the charge-coupled device. A detecting device 100H according to a ninth embodiment of the present invention is illustrated in FIG. 12 and includes a detecting carrier 10H, an optical system (not shown), and a processor (not shown) electrically connected to the optical system, wherein the optical system includes an excitation light source 20H, a filter and spectroscope group, and a scanning sensor group.

The excitation light La of the excitation light source 20H illuminates the biological particles, wherein when at least one kind of target biological particles in the biological particles is illuminated and excited by the excitation light La to generate an emission light Lb, the emission light Lb is separated to a first detecting light L1 and a second detecting light L2 to emit. A forward direction of the first detecting light L1 is different from a forward direction of the second detecting light L2, and the forward direction of the first detecting light L1 is opposite to a forward direction of the excitation light La, and the forward direction of the second detecting light L2 is the same as the forward direction of the excitation light La.

The filter and spectroscope group includes an objective 32H, a dichroic mirror 34H, a first filter set 36H, and a second filter set 37H, wherein the objective 32H and the second filter set 37H are sequentially disposed below the detecting carrier 10H from top down, and the dichroic mirror 34H is disposed above the detecting carrier 10H, and the first filter set 36H is located on a side of the dichroic mirror 34H. The objective 32H of the filter and spectroscope group is located on a light path of the second detecting light L2 and is adapted to focus the at least one kind of target biological particles and enlarge and image the target biological particles. The dichroic mirror 34H is located on a light path of the first detecting light L1 and is adapted to reflect the first detecting light L1. The first filter set 36H and the second filter set 37H are respectively located on the light path of the first detecting light L1 and the light path of the second detecting light L2.

The scanning sensor group includes a photomultiplier tube 42H and a charge-coupled device 44H, wherein the charge-coupled device 44H is located below the second filter set 37H on the light path of the second detecting light L2 and is adapted to receive the second detecting light L2. The photomultiplier tube 42H is located on a side of the filter set 36H on the light path of the first detecting light L1 and is adapted to receive the first detecting light L1. When the photomultiplier tube 42H moves relative to the detecting carrier 10H to scan the detecting carrier 10H and receives the first detecting light L1, the photomultiplier tube 42H generates a regional positioning signal including a regional position of the at least one kind of target biological particles on the detecting carrier 10H. When the charge-coupled device 44H moves relative to the detecting carrier 10H and receives the second detecting light L2, the charge-coupled device 44H generates an image signal including an image position of the at least one kind of target biological particles on the detecting carrier 10H.

A detecting method X of the detecting device 100H of the current embodiment includes following steps A-G:

Step A: the excitation light source 20H emits the excitation light La, and the excitation light La illuminates the biological particles on the detecting carrier 10H;

Step B: the at least one kind of target biological particles in the biological particles absorbs the excitation light La to generate the emission light Lb;

Step C: the emission light Lb is separated into the first detecting light L1 with an upward forward direction and the second detecting light L2 with a downward forward direction to emit;

a step between step C and step D: the first detecting light L1 is reflected by the dichroic mirror 34H to be emitted to the first filter set 36H, and the first filter set 36H allows the waveband of the first detecting light L1 to penetrate through a light filter and filters out the excitation light La or lights with other wavebands, so that the emission light Lb enters the photomultiplier tube 42H again; the second detecting light L2 passes through the objective 32H and goes into a second filter set 37H, wherein the second filter set 37H allows the waveband of the second detecting light L2 to penetrate through a light filter and filters out the excitation light La or lights with other waveband, so that the emission light Lb enters the charge-coupled device 44H again;

Step D: the photomultiplier tube 42H and the detecting carrier 10H move relatively to scan the regional positions on the detecting carrier 10H; when the photomultiplier tube 42H receives the first detecting light L1 in one of the regional positions of the detecting carrier 10H, the photomultiplier tube 42H generates a regional positioning signal and transmits the regional positioning signal to the processor, wherein the regional positioning signal includes an intensity of the fluorescent signal of the at least one kind of target biological particles on the detecting carrier 10H;

Step E: the processor determines that the regional positions on the detecting carrier 10E have the target biological particles based on the regional positioning signal, and transmits the regional positioning signal to the charge-coupled device 44H;

Step F: the processor makes the charge-coupled device 44H to receive the second detecting light L2 to detect an image position of the at least one kind of target biological particles on the regional positions, thereby generating at least one image signal;

Step G: the processor obtains a precise location of the at least one kind of target biological particles in the regional positions on the detecting carrier 10H based on at least one of the image signals, and then returns to step D to scan other regional positions on the detecting carrier 10H which are not detected.

Another detecting method Y of the detecting device 100H of the current embodiment includes following steps A-G:

Step A: the excitation light source 20H emits the excitation light La, and the excitation light La illuminates the biological particles on the detecting carrier 10H;

Step B: the at least one kind of target biological particles in the biological particles absorbs the excitation light La to generate the emission light Lb;

Step C: the emission light Lb is separated into the first detecting light L1 with an upward forward direction and the second detecting light L2 with a downward forward direction to emit;

a step between step C and step D: the first detecting light L1 is reflected by the dichroic mirror 34H to be emitted to the first filter set 36H, and the first filter set 36H allows the waveband of the first detecting light L1 to penetrate through the light filter and filters out the excitation light La or lights with other wavebands, so that the emission light Lb enters the photomultiplier tube 42H again; the second detecting light L2 passes through the objective 32H and goes into a second filter set 37H, wherein the second filter set 37H allows the waveband of the second detecting light L2 to penetrate through a light filter and filters out the excitation light La or lights with other wavebands, so that the emission light Lb enters the charge-coupled device 44H again;

Step D: the photomultiplier tube 42H and the detecting carrier 10H move relatively to scan the regional positions on the detecting carrier 10H; when the photomultiplier tube 42H receives the first detecting light L1 in one of the regional positions of the detecting carrier 10H, the photomultiplier tube 42H generates a regional positioning signal and transmits the regional positioning signal to the processor until all of the regional positions are scanned, wherein the regional positioning signal includes a regional position and an intensity of the fluorescent signal of the at least one kind of target biological particles on the detecting carrier 10H;

Step E: the processor determines that at least one of the regional positions on the detecting carrier 10H has the at least one kind of target biological particles based on at least one of the regional positioning signals, and transmits at least one of the regional positioning signals to the charge-coupled device 44H;

Step F: the charge-coupled device 44H moves relative to the detecting carrier 10H based on at least one of the regional positioning signals, and receives the second detecting light L2 in each of the regional positions to detect the image position of the at least one kind of target biological particles on the detecting carrier 10H, thereby respectively generating an image signal;

Step G: the processor obtains a precise location of the at least one kind of target biological particles in at least one of the regional positions on the detecting carrier 10H based on the image signal.

In the current embodiment, the charge-coupled device 44H and the photomultiplier tube 42H of the detecting device 100H are independent, so that an effect of detecting the biological particles on the detecting carrier 10H could be faster than the detecting device of the conventional charge-coupled device, thereby enhancing an overall device operation speed.

Figure 13:
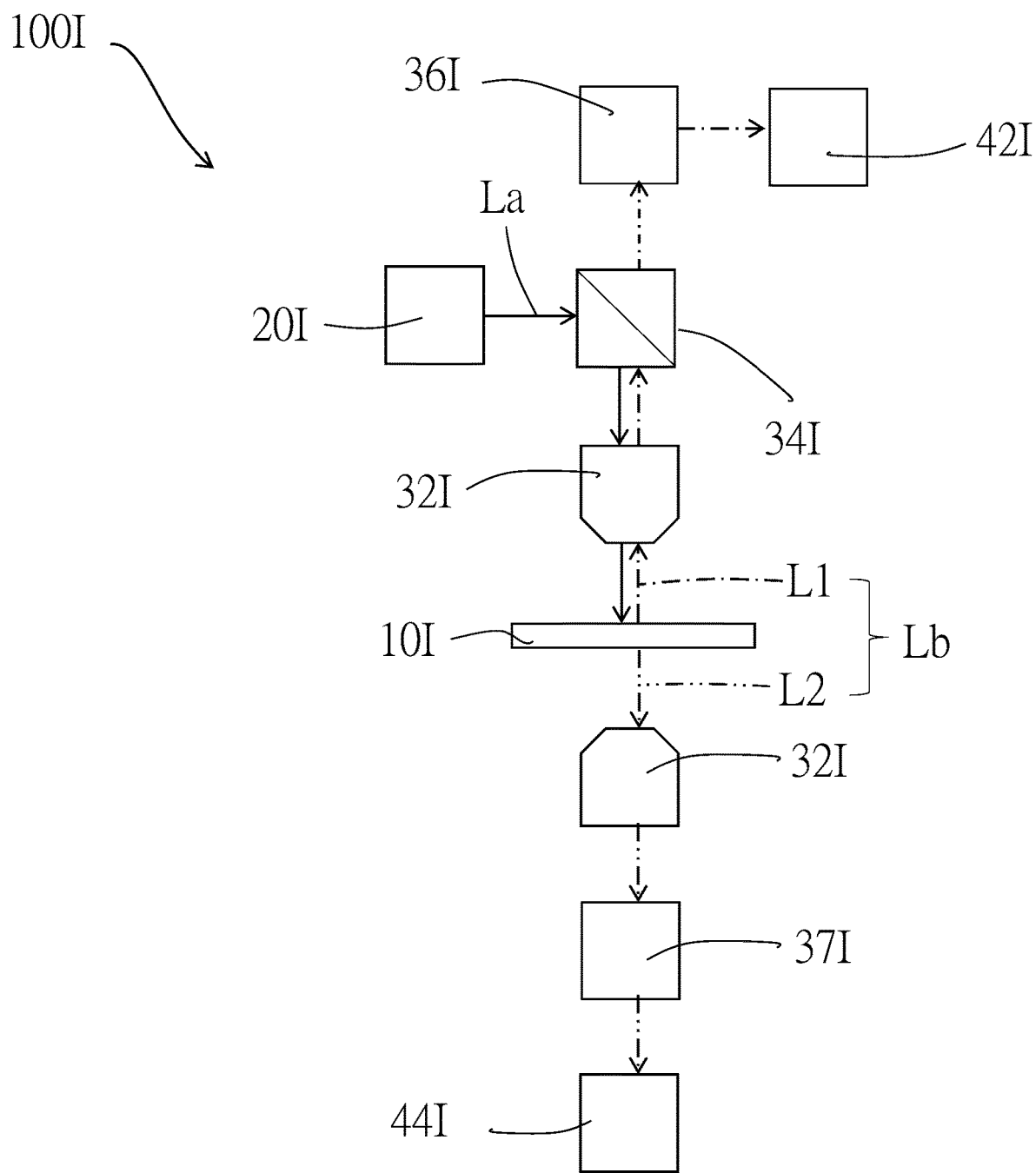
FIG. 13 is a schematic view of the detecting device for detecting biological particles according to a tenth embodiment of the present invention.

A detecting device 100I according to a tenth embodiment of the present invention is illustrated in FIG. 13, wherein the difference between the detecting device 100I of the tenth embodiment and that of the ninth embodiment is that a filter and spectroscope group of the detecting device 100I of the tenth embodiment further includes another objective 32I disposed above the detecting carrier 10I and located below the dichroic mirror 34I. In this way, when the photomultiplier tube 42I scans and detects the regional positions of the at least one kind of target biological particles and receives the first detecting light L1, the regional positions obtained by the photomultiplier tube 42I are smaller, which improves an accuracy of scanning.

In order to avoid a height of an overall device being too high, an excitation light source 20I of the current embodiment is disposed on a side of the dichroic mirror 34I, so that the difference between the detecting device 100I of the tenth embodiment and that of the ninth embodiment is that in the ninth embodiment, the excitation light La of the excitation light source 20H penetrates through the dichroic mirror 34H to reach the detecting carrier 10H, and the dichroic mirror 34H is located on the light path of the first detecting light L1 for reflecting the first detecting light L1 to the first filter set 36H; while in the tenth embodiment, the excitation light La of the excitation light source 20I is reflected by the dichroic mirror 34I and is focused by the objective 32I to illuminate the biological particles on the detecting carrier 10I, and the dichroic mirror 34I is located on the light path of the first detecting light L1, wherein the first detecting light L1 penetrates through the objective 32I and the dichroic mirror 34I and enters the first filter set 36I.

A position of the photomultiplier tube 42I and a position of the first filter set 36I which receive the first detecting light L1 are the same as that of the ninth embodiment, and a position of the objective 32I and a position of the second filter set 37I which are located below the detecting carrier 10I and a position of the charge-coupled device 44I which receives the second detecting light L2 are the same as that of the ninth embodiment, thus we are not going to describe it in details herein.

Figure 14:
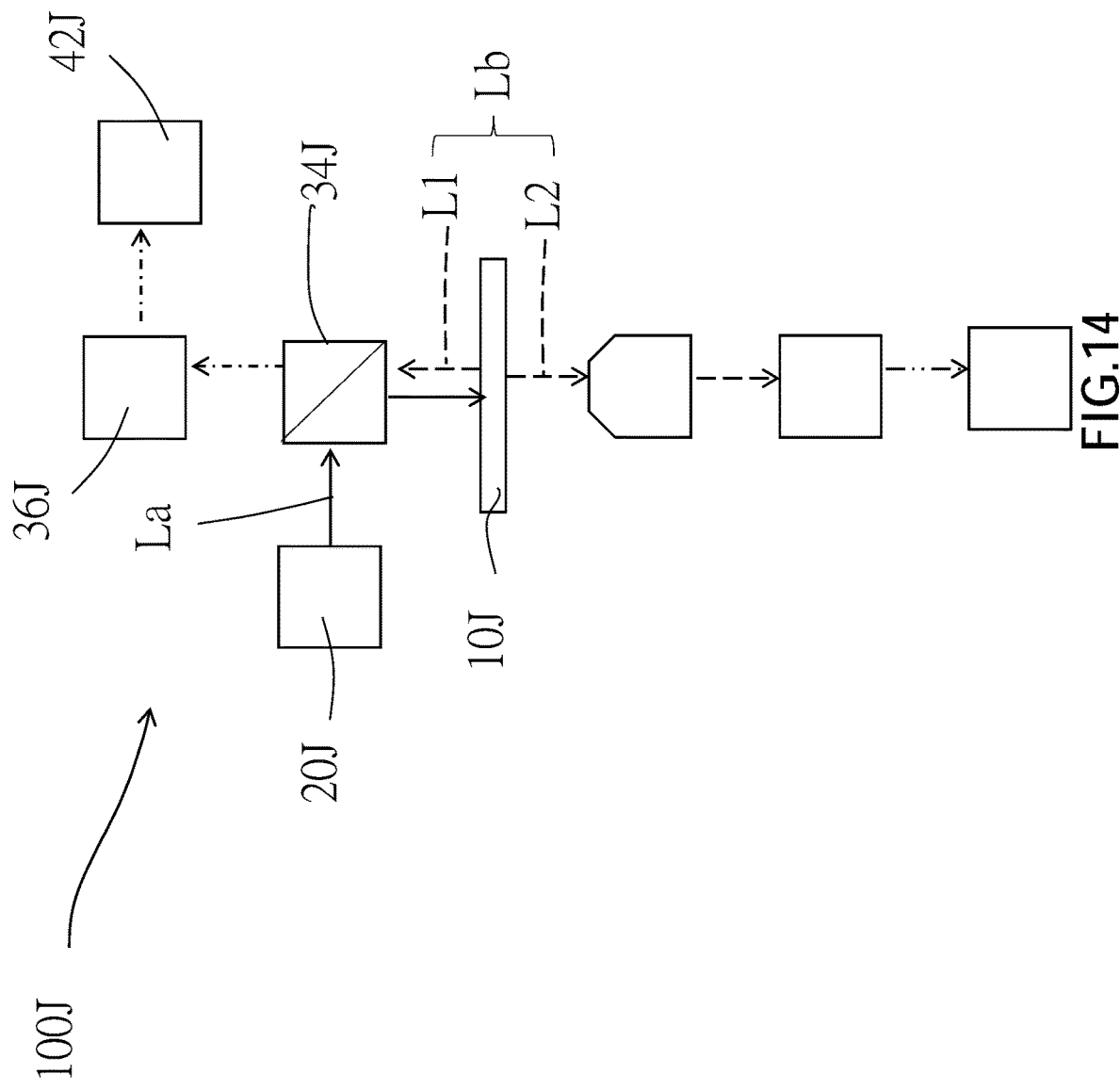
FIG. 14 is a schematic view of the detecting device for detecting biological particles according to an eleventh embodiment of the present invention.

A detecting device 100J according to an eleventh embodiment of the present invention is illustrated in FIG. 14, wherein the difference between the detecting device 100J of the eleventh embodiment and that of the tenth embodiment is that there is no objective disposed between a detecting carrier 10J and a dichroic mirror 34J of the detecting device 100J, so that a size and a weight of the overall detecting device 100I is smaller than the detecting device 100I of the tenth embodiment. In the current embodiment, the excitation light La of an excitation light source 20J is reflected by the dichroic mirror 34J to the detecting carrier 10J, and the dichroic mirror 34J is located on a light path of the first detecting light L1, and the first detecting light L1 penetrates through the dichroic mirror 34J and goes into the first filter set 36J and is received by the photomultiplier tube 42J. The other components of the detecting device 100J of the eleventh embodiment are the same as that of the tenth embodiment, thus we are not going to describe it in detail herein.

With the aforementioned design, the detecting device only needs an excitation light source and a filter and spectroscope group to achieve the purpose of scanning the photomultiplier tube and the charge-coupled device of the sensor group and locating the precise location of the at least one kind of target biological particles at the same time. Compared with the conventional detecting device in which each sensor must be equipped with a set of independent excitation light source and filter and spectroscope group, the detection device of the present invention has a smaller overall volume, a reduced weight, and also a reduced cost. Additionally, the charge-coupled device and the photomultiplier tube are integrated into a scanning sensor group, so that the movement during scanning and detecting could be more precise, without interference in mechanical motion. Moreover, the photomultiplier tube of the present invention first quickly scans to determine whether there is at least one kind of target biological particle, and locates the initial position of the at least one kind of target biological particles, and then the charge-coupled device finely locates the precise position of the at least one kind of target biological particles, thereby achieving high-efficiency detection and high detection accuracy.

It must be pointed out that the embodiments described above are only some preferred embodiments of the present invention. All equivalent methods which employ the concepts disclosed in this specification and the appended claims should fall within the scope of the present invention.

What is claimed is:

1. A detecting device for detecting a plurality of biological particles, comprising:
   a detecting carrier for placing the biological particles, wherein the biological particles comprise at least one kind of target biological particles;
   an optical system comprising:
   an excitation light source for providing an excitation light to illuminate the biological particles, wherein the at least one kind of target biological particles in the biological particles is illuminated and excited by the excitation light to generate an emission light;
   a filter and spectroscope group comprising a beam splitter, wherein the beam splitter is located on a light path of the emission light and is adapted to separate the incident emission light into a first detecting light and a second detecting light that account for different proportions of the emission light and respectively emit the first detecting light and the second detecting light, wherein a ratio of the first detecting light to the emission light ranges between 0.1 and 0.5, and a ratio of the second detecting light to the emission light ranges between 0.5 and 0.9;
   at least one photomultiplier tube for receiving the first detecting light, wherein the at least one photomultiplier tube moves relative to the detecting carrier to scan a plurality of regional positions on the detecting carrier, and the detecting carrier is fixed; when the at least one photomultiplier tube receives the first detecting light in at least one of the regional positions on the detecting carrier, the at least one photomultiplier tube generates a regional positioning signal comprising a regional position of the at least one kind of target biological particles on the detecting carrier; and
   at least one charge-coupled device for receiving the second detecting light, wherein when the at least one charge-coupled device receives the second detecting light, the at least one charge-coupled device generates an image signal comprising an image position of the at least one kind of target biological particles on the detecting carrier; and
   a processor electrically connected to the optical system and adapted to receive the regional positioning signal and the image signal, wherein when the processor receives the regional positioning signal, the processor transmits the regional positioning signal to the at least one charge-coupled device, so that the at least one charge-coupled device moves relative to the detecting carrier, which is fixed, to the regional positions based on the regional positioning signal and generates the image signal, and the at least one charge-coupled device receives the second detecting light to detect the image position of the at least one kind of target biological particles in the regional positions to generate an image signal, and the processor obtains a precise location of the at least one kind of target biological particles in the regional position on the detecting carrier based on the image signal.

2. The detecting device as claimed in claim 1, wherein the filter and spectroscope group comprises an objective located on the light path of the emission light and located between the detecting carrier and the at least one charge-coupled device.

3. The detecting device as claimed in claim 1, wherein the detecting carrier is located on a light path of the excitation light, so that the excitation light directly illuminates the biological particles.

4. The detecting device as claimed in claim 1, wherein the filter and spectroscope group comprises at least one filter set located on the light path of the emission light, a light path of the first detecting light, a light path of the second detecting light, or a light path of a combination thereof.

5. The detecting device as claimed in claim 1, wherein the filter and spectroscope group comprises at least one dichroic mirror located on a light path of the excitation light and adapted to reflect the excitation light, so that the excitation light being reflected illuminates the biological particles.

6. The detecting device as claimed in claim 5, wherein the at least one dichroic mirror includes a plurality of dichroic mirrors, and the at least one photomultiplier tube includes a plurality of photomultiplier tubes, and the at least one kind of target biological particles includes a plurality of kinds of target biological particles; at least one of the dichroic mirrors is located on a light path of the first detecting light for separating the incident first detecting light into a plurality of first detecting light wavebands with different wavebands to emit, wherein the first detecting light wavebands are respectively received by at least two of the photomultiplier tubes, so that the photomultiplier tubes respectively generate a regional positioning signal, and the regional positioning signals respectively comprises the regional position of the different kinds of target biological particles on the detecting carrier.

7. The detecting device as claimed in claim 5, wherein the at least one dichroic mirror includes a plurality of dichroic mirrors, and the at least one charge-coupled device includes a plurality of charge-coupled devices, and the at least one kind of target biological particles includes a plurality of kinds of target biological particles; at least one of the dichroic mirrors is located on a light path of the second detecting light for separating the incident second detecting light into a plurality of second detecting light wavebands with different wavebands to emit, wherein the second detecting light wavebands are respectively received by at least two of the charge-coupled devices, so that the charge-coupled devices respectively generate an image signal, and the image signals comprises the image position of at least one of the different kinds of target biological particles on the detecting carrier.

8. A detecting method which is applied to the detecting device as claimed in claim 1, comprising the following steps:
   Step A: emitting the excitation light by the excitation light source to illuminate the biological particles;
   Step B: absorbing the excitation light by the at least one kind of target biological particles in the biological particles to generate the emission light, and emitting the emission light into the filter and spectroscope group;
   Step C: separating the emission light into the first detecting light and the second detecting light by the filter and spectroscope group to emit, and the first detecting light and the second detecting light respectively enter the at least one photomultiplier tube and the at least one charge-coupled device;

Step D: moving the at least one photomultiplier tube relative to the detecting carrier to scan the regional positions on the detecting carrier; when the at least one photomultiplier tube receives the first detecting light in at least one of the regional positions on the detecting carrier, the at least one photomultiplier tube generates at least one of the regional positioning signals, wherein the detecting carrier is fixed;

Step E: determining that at least one of the regional positions on the detecting carrier has the at least one kind of target biological particles by the processor based on the regional positioning signal, and the processor transmits at least one of the regional positioning signals to the at least one charge-coupled device;

Step F: receiving the second detecting light and generating an image signal by the at least one charge-coupled device, wherein the at least one charge-coupled device moves relative to the detecting carrier to the regional positions based on the regional positioning signal and generates the image signal, and the at least one charge-coupled device receives the second detecting light to detect the image position of the at least one kind of target biological particles in the regional positions to generate an image signal, wherein the detecting carrier is fixed;

Step G: obtaining a precise location of the at least one kind of target biological particles in at least one of the regional positions on the detecting carrier by the processor based on the image signal.

9. The detecting method as claimed in claim 8, wherein step E is executed after the at least one photomultiplier tube scanning all of the regional positions on the detecting carrier in step D; step F is executed after the processor determining which regional positions on the detecting carrier generates the regional positioning signal in step E; in step F, the at least one charge-coupled device moves relative to the detecting carrier, thereby generating the image signal of at least one of the regional positions of the at least one kind of target biological particles on the detecting carrier in sequence.

10. The detecting method as claimed in claim 8, wherein the filter and spectroscope group of the optical system comprises the beam splitter and an objective; the beam splitter separates the emission light into the first detecting light and the second detecting light to emit; the objective is located on the light path of the emission light and is located between the detecting carrier and the at least one charge-coupled device; the detecting method comprises the following steps between step B and step C: the emission light penetrates through the objective and goes into the beam splitter.

11. The detecting method as claimed in claim 8, wherein the filter and spectroscope group of the optical system comprises a dichroic mirror located on a light path of the excitation light; step A comprises the following steps: the excitation light is reflected by the dichroic mirror and illuminates the biological particles.

12. The detecting method as claimed in claim 8, wherein the filter and spectroscope group of the optical system comprises a filter set and the beam splitter; both of the filter set and the beam splitter are located on the light path of the emission light; the beam splitter separates the emission light into the first detecting light and the second detecting light to emit; the detecting method comprises the following steps between step B and step C: the filter set is penetrated through by only a waveband of the emission light, so that the emission light penetrates through the filter set and goes into the beam splitter.

13. The detecting method as claimed in claim 8, wherein the filter and spectroscope group of the optical system comprises a first filter set, a second filter set, and the beam splitter; the first filter set and the second filter set are respectively located on a light path of the first detecting light and a light path of the second detecting light; the beam splitter is located on the light path of the emission light and separates the emission light into the first detecting light and the second detecting light to emit; the detecting method comprises the following steps between step C and step D: the first filter set is penetrated through by only a waveband of the first detecting light, so that the first detecting light penetrates through the first filter set and goes into the at least one photomultiplier tube; the second filter set is penetrated through by only a waveband of the second detecting light, so that the second detecting light penetrates through the second filter set and goes into the at least one charge-coupled device.

* * * * *